US009717035B2

(12) United States Patent
Torres et al.

(10) Patent No.: US 9,717,035 B2
(45) Date of Patent: Jul. 25, 2017

(54) METHODS AND SYSTEM IN SUPPORTING REAL TIME SERVICES WITH SPECTRUM EFFICIENCY IN A SATELLITE NETWORK

(71) Applicant: Hughes Network systems, Germantown, MD (US)

(72) Inventors: Robert Torres, New Market, MD (US); Jun Xu, Clarksburg, MD (US); John Border, Adamstown, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 0 days.

(21) Appl. No.: 14/696,359

(22) Filed: Apr. 24, 2015

(65) Prior Publication Data
US 2015/0312838 A1 Oct. 29, 2015

Related U.S. Application Data

(60) Provisional application No. 61/984,035, filed on Apr. 24, 2014.

(51) Int. Cl.
*H04W 40/12* (2009.01)
*H04L 29/06* (2006.01)
*H04W 72/04* (2009.01)
*H04B 7/185* (2006.01)
*H04W 28/20* (2009.01)

(52) U.S. Cl.
CPC ...... *H04W 40/125* (2013.01); *H04B 7/18582* (2013.01); *H04L 65/103* (2013.01); *H04L 65/1006* (2013.01); *H04L 65/1069* (2013.01); *H04L 65/80* (2013.01); *H04W 72/0453* (2013.01); *H04W 28/20* (2013.01)

(58) Field of Classification Search
CPC ............. H04L 65/1006; H04L 65/103; H04W 72/0453; H04W 40/125; H04W 28/20
See application file for complete search history.

(56) References Cited

U.S. PATENT DOCUMENTS

2007/0002832 A1  1/2007  Sylvain
2010/0036953 A1  2/2010  Bogovic et al.
(Continued)

OTHER PUBLICATIONS

PCT/US2015/027674 ISR & WO, Jul. 22, 2015.

*Primary Examiner* — Gbemileke J Onamuti
(74) *Attorney, Agent, or Firm* — Potomac Technology Law, LLC

(57) ABSTRACT

Approaches are provided for efficient bandwidth allocation for real-time service traffic flows, providing for assured QoS and efficient spectrum utilization. A terminal of a wireless communications network receives data from one or more associated interface devices. A snooper captures a session request message from one of the interface devices for initiation of a setup process to establish a communications session over the communications network, and parses the session request message to obtain associated session parameters. Inroute bandwidth requirements for the communications session are determined based on the session parameters. A bandwidth reservation process is initiated to obtain bandwidth allocations to satisfy the inroute bandwidth requirements. The session request message is held until completion of the bandwidth reservation process, whereupon the session request message is transmitted to a session controller at a core node of the network, and the setup process to establish the communications session is completed.

14 Claims, 18 Drawing Sheets

(56) References Cited

U.S. PATENT DOCUMENTS

2011/0239259 A1 9/2011 Udani et al.
2012/0106326 A1 5/2012 Polk et al.
2013/0201991 A1 8/2013 Wing et al.

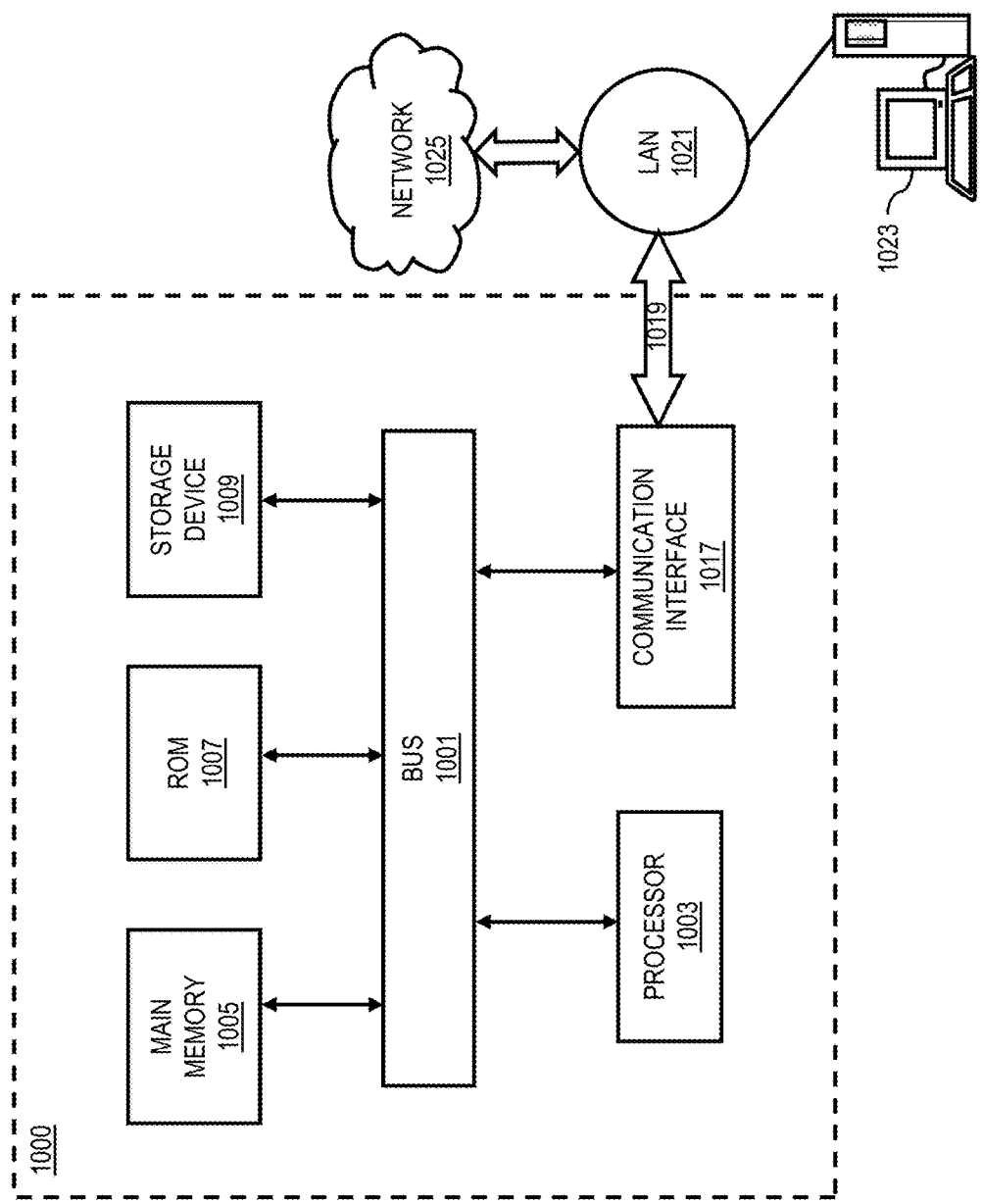

METHODS AND SYSTEM IN SUPPORTING REAL TIME SERVICES WITH SPECTRUM EFFICIENCY IN A SATELLITE NETWORK

RELATED APPLICATIONS

This application claims the benefit of the earlier filing date under 35 U.S.C. §119(e) of U.S. Provisional Application Ser. No. 61/984,035 (filed 2014 Apr. 24).

BACKGROUND

The overall capacities of broadband satellites are increasing exponentially, and such capacity increases present unique challenges in the associated ground system and network designs. The goal of the system designers, system operators, and service providers is to support and provide efficient, robust, reliable and flexible services utilizing such high capacity satellite systems. Further, in a shared bandwidth network, the wireless spectrum or bandwidth is shared by multiple remote nodes or terminals. Such broadband satellite networks typically support a variety of services utilizing multiple traffic types of differing quality of service (QoS) characteristics (e.g., Internet traffic, bulk data transfers, and real-time (RT) traffic, such as voice over IP (VOIP) or interactive or streaming video). For example, RT traffic has strict latency, jitter and packet loss requirements, where, in order to satisfy such requirements, it would be costly (e.g., from a channel efficiency standpoint) to provide continuous, reserved bandwidth for a certain remote terminal running real-time applications. Additionally, one or more remote terminals can each have multiple real-time flows, which may arrive at the same time.

In a current time division multiple access (TDMA) system, for example, a VOIP call may be assigned TDMA slots with fixed positions periodically. As such, as multiple calls come in and go out of the network randomly, gaps would be present in the available slots for non-real-time (NRT) traffic, resulting in either higher overhead in using the slots or enhanced complexity in transmitting NRT traffic bursts. Additionally, the seamless convergence of RT and NRT traffic presents further challenges for efficient spectrum utilization and QoS assurance.

Moreover, in such shared bandwidth systems, it is difficult to discern real-time traffic flows from other flows, to allocate the correct amount of bandwidth for the real-time flows, to allocate bandwidth in a manner that reduces latency and jitter of the real-time flows, to manage multiple real-time flows from multiple different remote terminals of the network in an efficient manner, and to provide satisfactory performance (e.g., to facilitate an acceptable user experience) during the setup of the real-time traffic flows for the respective applications.

What is needed, therefore, is a system and methods to address the challenges supporting real-time traffic flows for respective real-time services, providing for assured QoS and efficient spectrum utilization (e.g., in a shared bandwidth broadband satellite network that supports convergent multimedia services).

SOME EXAMPLE EMBODIMENTS

Embodiments of the present invention advantageously address the foregoing requirements and needs, as well as others, by providing novel approaches for link and network layer processes facilitating efficient bandwidth allocation for real-time traffic flows associated with respective real-time services, providing for assured QoS and efficient spectrum utilization (e.g., in a shared bandwidth broadband satellite network that supports convergent multimedia services).

By way of example, such link and network layer processes include a novel approach for real-time traffic flow setup (e.g., VOIP call setup) at the respective remote terminal, where a session initiation protocol (SIP) snooper is employed to snoop or monitor for real-time data flow initiation, and to function as a SIP proxy of reduced complexity. The SIP proxy at the terminal, for example, provides for both bandwidth reservation and call tracking.

By way of further example, such link and network layer processes include an efficient bandwidth allocation approach that seamlessly incorporates real-time flows with existing non-real-time flows at the link layer, with quality of service (QoS) assurance, where both the RT data flow and NRT data flow use the same physical layer burst forms, where a converged traffic flow significantly improves the spectrum efficiency. In accordance with such a bandwidth allocation approach, for example, an algorithm rearranges the slot positions of RT calls from time to time when a call leaves the system and packs the RT calls together, allowing the RT and NRT slots positioned separately, which facilitates efficient utilization of network resources when multiplexing multiple remote terminal calls in the forward direction and multiple calls of one remote terminal in the return direction.

By way of further example, such link and network layer processes include a network access control method utilizing an admission control unit (ACU), which facilitates RT traffic load balancing and assigns RT flows to more robust channels when the current transmission deteriorates due to fading. The ACU, for example, manages radio resources for multiple calls from a plurality of remote terminals.

Such novel processes thereby address the challenges supporting real-time traffic flows for respective real-time services, providing for assured QoS and efficient spectrum utilization (e.g., in a shared bandwidth broadband satellite network that supports convergent multimedia services).

In accordance with example embodiments of the present invention, a method for such processes for efficient bandwidth allocation for real-time traffic flows is provided. A remote terminal of a wireless communications network receives respective data communications from one or more interface devices associated with the remote terminal. A session request message from a one of the interface device(s) for initiation of a setup process to establish a first communications session over the wireless communications network is captured. The session request message is parsed to obtain session parameters regarding the first communications session. Inroute bandwidth requirements for the first communications session are determined based at least in part on the session parameters. A bandwidth reservation process is initiated to obtain inroute bandwidth allocations to satisfy the inroute bandwidth requirements for the first communications session. The session request message is held until completion of the bandwidth reservation process. Upon completion of the bandwidth reservation process, the session request message is transmitted to a session controller at a core node of the wireless communications network. The setup process with the core node to establish the first communications session is then completed.

In accordance with further example embodiments of the present invention, an apparatus is provided for efficient bandwidth allocation for real-time traffic flows method for 3. The apparatus comprises a receiver configured to receive respective data communications from one or more interface devices associated with the apparatus. The apparatus further comprises a data parser configured to capture a session request message received from a one of the interface device(s) for initiation of a setup process to establish a first communications session over a wireless communications network, and to parse the session request message to obtain session parameters regarding the first communications session. The apparatus further comprises a bandwidth processor configured to determining inroute bandwidth requirements for the first communications session based at least in part on the session parameters, and to initiate a bandwidth reservation process to obtain inroute bandwidth allocations to satisfy the inroute bandwidth requirements for the first communications session. Wherein the data parser is further configured to hold the session request message until completion of the bandwidth reservation process, and to forward the session request message for transmission to a session controller at a core node of the wireless communications network upon completion of the bandwidth reservation process.

Still other aspects, features, and advantages of embodiments of the present invention are readily apparent from the following detailed description, simply by illustrating a number of particular embodiments and implementations, including the best mode contemplated for carrying out the present invention. The present invention may be realized via other and different embodiments, and its several details can be modified in various obvious respects, all without departing from the spirit and scope of the present invention. Accordingly, the drawing and description are to be regarded as illustrative in nature, and not as restrictive.

BRIEF DESCRIPTION OF THE DRAWINGS

Embodiments of the present invention are illustrated by way of example, and not by way of limitation, in the figures of the accompanying drawings, in which like reference numerals refer to similar elements and in which:

FIG. 10 illustrates a computer system upon which example embodiments according to the present invention can be implemented.

DETAILED DESCRIPTION

Figure 1A:
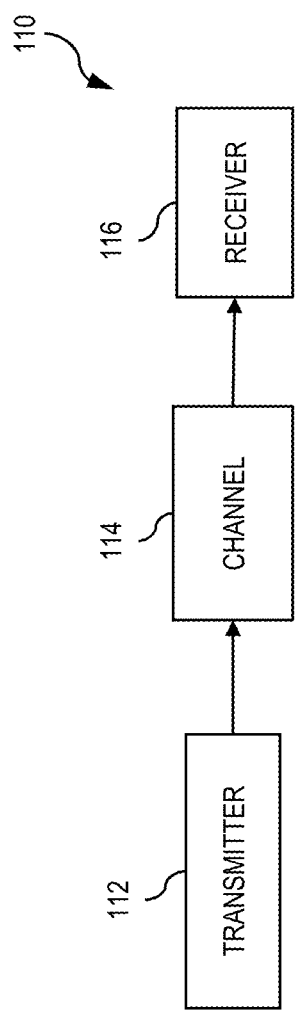
FIGS. 1A, 1B and 1C illustrate communications systems capable of employing approaches, in accordance with exemplary embodiments.

Approaches for link and network layer processes facilitating efficient bandwidth allocation for real-time traffic flows associated with respective real-time services, providing for assured QoS and efficient spectrum utilization (e.g., in a shared bandwidth broadband satellite network that supports convergent multimedia services), are described. In the following description, for the purposes of explanation, numerous specific details are set forth in order to provide a thorough understanding of the present invention. The present invention is not intended to be limited based on the described embodiments, and various modifications will be readily apparent. It will be apparent that the invention may be practiced without the specific details of the following description and/or with equivalent arrangements. Additionally, well-known structures and devices may be shown in block diagram form in order to avoid unnecessarily obscuring the invention. Further, the specific applications discussed herein are provided only as representative examples, and the principles described herein may be applied to other embodiments and applications without departing from the general scope of the present invention.

As will be appreciated, a module or component (as referred to herein) may be composed of software component(s), which are stored in a memory or other computer-readable storage medium, and executed by one or more processors or CPUs of the respective devices. As will also be appreciated, however, a module may alternatively be composed of hardware component(s) or firmware component(s), or a combination of hardware, firmware and/or software components. Further, with respect to the various example embodiments described herein, while certain of the functions are described as being performed by certain components or modules (or combinations thereof), such descriptions are provided as examples and are thus not intended to be limiting. Accordingly, any such functions may be envisioned as being performed by other components or modules (or combinations thereof), without departing from the spirit and general scope of the present invention. Moreover, the methods, processes and approaches described herein may be processor-implemented using processing circuitry that may comprise one or more microprocessors, application specific integrated circuits (ASICs), field programmable gate arrays (FPGAs), or other devices operable to be configured or programmed to implement the systems and/or methods described herein. For implementation on such devices that are operable to execute software instructions, the flow diagrams and methods described herein may be implemented in processor instructions stored in a computer-readable medium, such as executable software stored in a computer memory store.

Further, terminology referring to computer-readable media or computer media or the like as used herein refers to any medium that participates in providing instructions to the processor of a computer or processor module or component for execution. Such a medium may take many forms, including but not limited to non-transitory non-volatile media and volatile media. Non-volatile media include, for example, optical disk media, magnetic disk media or electrical disk media (e.g., solid state disk or SDD). Volatile media include dynamic memory, such random access memory or RAM. Common forms of computer-readable media include, for example, floppy or flexible disk, hard disk, magnetic tape, any other magnetic medium, CD ROM, CDRW, DVD, any other optical medium, random access memory (RAM), programmable read only memory (PROM), erasable PROM, flash EPROM, any other memory chip or cartridge, or any other medium from which a computer can read data.

Various protocols exist for the setup, management and teardown of real-time sessions (e.g., voice and multimedia sessions) over broadband communications networks (e.g., IP packet-based networks). For example, session Initiation Protocol (SIP) is an Internet Engineering Task Force (IETF) standard real-time session control protocol, as described (for example) in the IETF publication RFC 3261, "SIP: Session Initiation Protocol," June 2002. SIP provides the protocol for the signaling and session management for real-time sessions over IP packet-based networks. SIP is an application layer protocol that provides for the establishment, modification and termination of multimedia sessions over channels of such networks. As a further example, with regard to data transmission for such real-time sessions, data communications for such SIP-based applications may be transmitted over packet-based network channels utilizing real-time transport (RTP) protocol. Further, parameters (e.g., port numbers, protocols, codec designations, etc.) for such real-time sessions may be defined and negotiated using session description protocol (SDP), as described (for example) in the IETF publication, RFC 4566, "SDP: Session Description Protocol," July 2006. The SDP parameters are transported in the SIP packet body. A primary function of SIP is to provide a signaling and session setup protocol for IP-based communications that can support a superset of the call processing functions and features present in the public switched telephone network (PSTN).

In a shared bandwidth, broadband satellite network, however, supporting SIP based real-time services present significant challenges. Such challenges include the fact that real-time services may require constant bit rate (CBR) sessions. In a satellite network, in order to preserve the channel resources (bandwidth), the bandwidth is typically assigned based on demand. Accordingly, efficient identification of session bandwidth requirements is important for SIP sessions. A further challenge is based on the fact that SIP-based RTP traffic is delay and jitter sensitive, and thus may be better served via dedicated channels. A broadband satellite network, however, generally supports a variety of traffic classes, such as voice, video, streaming data, web browsing data, interactive data, and other data types. In such a network, the real-time SIP-based services should be integrated seamlessly with the other traffic types for efficient use the satellite bandwidth resources. A further challenge presents itself based on capacity limitations of satellite network channels, where, based on such limitations, the number of concurrent RTP sessions may be restricted. Additionally, a remote terminal may experience location or channel condition changes (e.g., when a channel degrades, the terminal may release the current bandwidth and seek to acquire spectrum of a lower symbol rate for higher link margin), which situations require admission functions at the gateway station to coordinate the RTP sessions.

In order to address such challenges, embodiments of the present invention provide approaches for supporting real-time services (such as VOIP and interactive video) based on SIP in a shared bandwidth, packet-based broadband satellite network. It consists of the algorithms that perform bandwidth request, bandwidth allocation and admission control for facilitate SIP based real-time services in the satellite network. In that regard, embodiments of the present invention provide novel approaches for link and network layer processes that facilitate efficient bandwidth allocation for real-time (RT) traffic flows associated with respective real-time services. By way of example, such link and network layer processes include a novel approach for RT traffic flow setup (e.g., VOIP call setup) at the respective remote terminal, where a session initiation protocol (SIP) snooper is employed to snoop or monitor for RT data flow initiation, and to function as a SIP proxy of reduced complexity. The SIP proxy at the terminal, for example, provides for both bandwidth reservation and call tracking. By way of further example, such link and network layer processes include an efficient bandwidth allocation approach that seamlessly incorporates RT flows with existing non-real-time (NRT) flows at the link layer, with quality of service (QoS) assurance, where both the RT data flow and NRT data flow use the same physical layer burst forms, where a converged traffic flow greatly improves the spectrum efficiency. In accordance with such a bandwidth allocation approach, for example, an algorithm rearranges the slot positions of RT sessions (e.g., calls) from time to time when a call leaves the system, and packs the RT calls together, allowing the RT and NRT slots positioned separately, which facilitates efficient utilization of network resources when multiplexing multiple remote terminal RT sessions in the forward direction and multiple RT sessions of one remote terminal in the return direction. By way of further example, such link and network layer processes include a network access control method utilizing an admission control unit (ACU), which facilitates RT traffic load balancing and assigns RT flows to more robust channels when the current transmission deteriorates due to fading. The ACU, for example, manages radio resources for multiple calls from a plurality of remote terminals. Such novel processes thereby address the challenges supporting real-time traffic flows for respective real-time services, providing for assured QoS and efficient spectrum utilization (e.g., in a shared bandwidth broadband satellite network that supports convergent multimedia services). By way of example (and not limitation), the following description specifically focuses on voice over IP (VOIP) and video calls as representative examples of generic RTP flows.

Figure 1B:
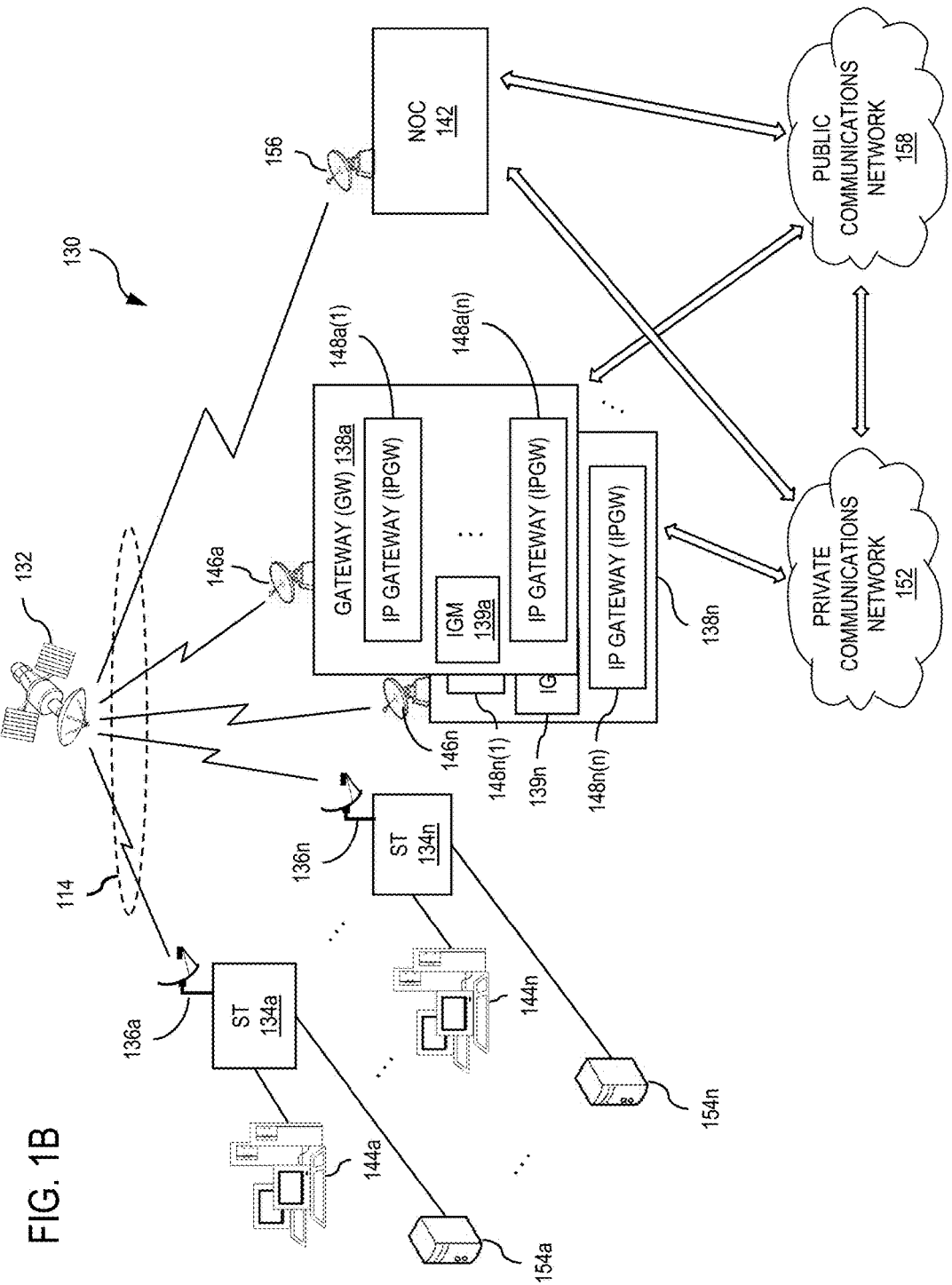
Figure 1C:
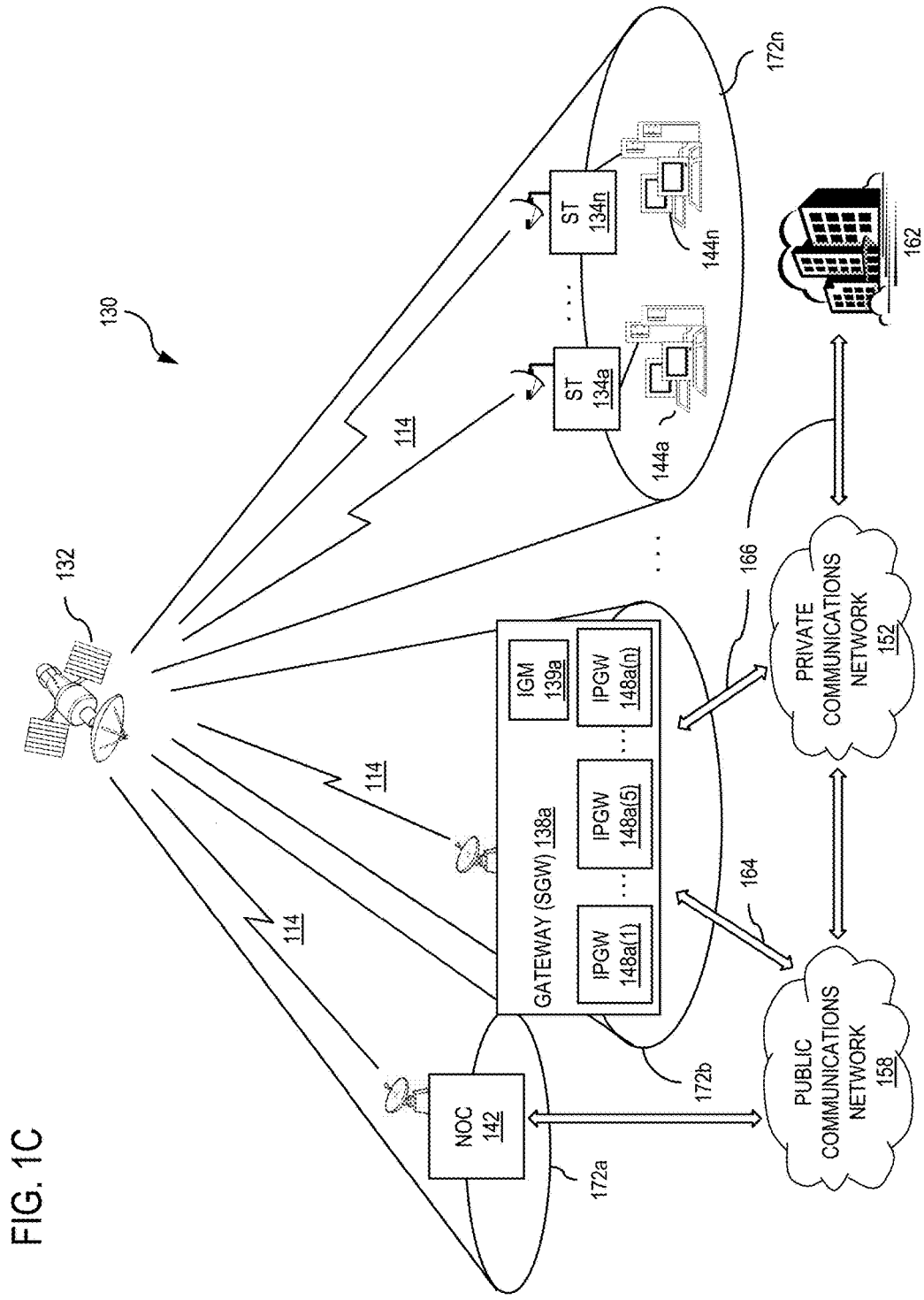

FIGS. 1A-1C illustrate communications systems capable of employing a bandwidth allocation approach (e.g., for a shared bandwidth network environment, such as a shared bandwidth satellite system) that satisfies QoS requirements for interactive traffic, while optimizing channel/bandwidth utilization, according to various exemplary embodiments. With reference to FIG. 1A, a broadband communications system 110 includes one or more transmitters 112 (of which one is shown) that generate signal waveforms for transmission to one or more receivers 116 (of which one is shown).

The signal waveforms are transmitted across a communications channel 114, which (for example) may comprise a channel of a terrestrial, wireless terrestrial or satellite communications system. In this discrete communications system 110, the transmitter 112 has a signal source that produces a discrete set of data signals, where each of the data signals is transmitted over a corresponding signal waveform. The discrete set of data signals may first be encoded (e.g., via a forward error correction code) to combat noise and other issues associated with the channel 114. Once encoded, the encoded signals may then be modulated onto a carrier for transmission over the channel 114. The signal waveforms are attenuated, or otherwise altered, by communications channel 114. Further, for example, the system employs the Digital Video Broadcasting (DVB) second generation framing structure, channel coding and modulation systems for . . . broadband satellite applications standard (the DVB-S2 standard), as described in the European Telecommunications Standards Institute publication, ETSI EN 302 307, as the forward direction (outroute) air interface; and employs TDMA as the return direction (inroute). Moreover, as will be readily apparent, the algorithms of the described embodiments are adaptively applicable to other multiple access interfaces.

FIG. 1B illustrates an exemplary satellite communications system 130 capable of supporting communications among terminals with varied capabilities, according to exemplary embodiments. Satellite communications system 130 includes a satellite 132 that supports communications among multiple satellite terminals (STs) 134a-134n, a number of gateways (GWs) 138a-138n, and a network operations center (NOC) 142. The STs, GWs and NOC transmit and receive signals via the antennas 136a-136n, 146a-146n, and 156, respectively. According to different embodiments, the NOC 142 may reside at a separate site reachable via a separate satellite channel or may reside within a GW site. The NOC 142 performs the management plane functions of the system 130, while the GWs 138a-138n perform the data plane functions of the system 130. For example, the NOC 142 performs such functions as network management and configuration, software downloads (e.g., to the STs 134a-134n), status monitoring, statistics functions (e.g., collection, aggregation and reporting), security functions (e.g., key generation, management and distribution), ST registration and authentication, and GW diversity management. The NOC 142 communicates with each GW via the satellite 132, or via a secure private communications network 152 (e.g., an IPsec tunnel over a dedicated link or a virtual private network (VPN) or IPsec tunnel through a public network, such as the Internet). It should be noted that, according to one exemplary embodiment, the traffic classification approaches of embodiments of the present invention address classification of data traffic flowing through an aggregation point or node. Additionally, each GW and the NOC have connectivity to one or more public communications networks, such as the Internet or a PSTN.

According to a further exemplary embodiment, each of the GWs 138a-138n include one or more IP gateways (IPGWs)—whereby the data plane functions are divided between a GW and its respective IPGWs. For example, GW 138a includes IPGWs 148a(1)-148a(n) and GW 138n includes IPGWs 148n(1)-148n(n). A GW may perform such functions as link layer and physical layer outroute coding and modulation (e.g., DVB-S2 adaptive coding and modulation), link layer and physical layer inroute handling (e.g., IPOS), inroute bandwidth allocation and load balancing, outroute prioritization, web acceleration and HTTP compression, flow control, encryption, redundancy switchovers, and traffic restriction policy enforcement. Accordingly, an inroute manager or inroute group manager (IGM) 139a . . . 139n may be located at each of the gateways 138a . . . 138n, respectively. The IGM may be configured to control the bandwidth allocations to the remote terminals (e.g., on an inroute or inroute group basis), and to correspondingly control and administer the bandwidth allocation approaches provided in accordance with the example embodiments of the present invention. Further, as would be appreciated, in certain embodiments, the IGM may be deployed in a distributed manner, with a main controller at the NOC 142, whereby the NOC may be configured to administer system-wide controls for such bandwidth allocation approaches, whereas the inroute-based controls would be administered for specific inroutes/inroute groups by the IGM at the respective gateway that controls such inroutes/inroute groups. Various other architectures may also be provided to meet respective different system design goals and requirements.

The IPGW may perform such functions as data compression, TCP performance enhancements (e.g., TCP performance enhancing proxies, such as TCP spoofing), quality of service functions (e.g., classification, prioritization, differentiation, random early detection (RED), TCP/UDP flow control), bandwidth usage policing, dynamic load balancing, and routing. Further, a GW and respective IPGW may be collocated with the NOC 142. The STs 134a-134n provide connectivity to one or more hosts 144a-144n and/or routers 154a-154n, respectively. The Satellite communications system 130 may operate as a bent-pipe system, where the satellite essentially operates as a repeater or bent pipe. Alternatively, the system 130 may employ a switching or processing satellite supporting mesh communications (point-to-point communications directly between, for example, the two STs 134a and 134n).

In a bent-pipe system of an exemplary embodiment, the satellite 132 operates as a repeater or bent pipe, and communications to and from the STs 134a-134n are transmitted over the satellite 132 to and from respective IPGWs associated with particular STs. Further, in a spot beam system, any one spot beam operates as a bent-pipe to geographic region covered by the beam. For example, each spot beam operates as a bent pipe communications channel to and from the STs and/or IPGW(s) within the geographic region covered by the beam. Accordingly, signal transmissions to the satellite are either from an ST and destined for an associated gateway, or from a gateway and destined for an associated ST. According to one embodiment, several GWs/IPGWs are distributed across the geographic region covered by all spot beams of the satellite 132, where, in a beam in which a GW (and respective IPGWs) are located, only the one GW (and no STs) occupies that beam. Further, each IPGW may serve as an aggregation node for a multitude of remote nodes or STs. The total number of GWs/IPGWs, and the geographic distribution of the GWs/IPGWs, depends on a number of factors, such as the total capacity of the satellite dedicated to data traffic, geographic traffic loading of the system (e.g., based on population densities and the geographic distribution of the STs), locations of available terrestrial data centers (e.g., terrestrial data trunks for access to public and private dedicated networks).

More specifically, with reference to FIG. 1C, for example, for a data communication from ST 134a to a public communications network 158 (e.g., the Internet), the ST 134a is associated with an IPGW (e.g., IPGW 148a(1)—selected from a pool of IPGWs available to the ST 134a, such as IPGWs 148*a*(1)-148*a*(5)—where the pool of IPGWs is a suitable subset of the IPGWs 148*a*(1)-148*a*(n) located at the GW 138*a*). The data is first transmitted, via the satellite 132, from the ST 134*a* to associated IPGW 148*a*(1). The IPGW 148*a*(1) determines the destination as being the Internet 158. The IPGW then repackages the data (e.g., as a TCP/IP communication), and routes the data communication, via the terrestrial link 164, to the Internet 158. Further, in a corporate network, for example, a corporation may deploy various remote STs at remote offices. More specifically, ST 134*n*, located at a remote corporate location, may desire to securely communicate with the corporate headquarters 162. Accordingly, for a data communication from ST 134*n* to the corporate headquarters 162, the data is first transmitted, via the satellite 132, from the ST 134*n* to an IPGW associated with the ST 134*n* (e.g., IPGW 148*a*(5)). The IPGW 148*a*(5) determines the destination as being the corporate headquarters 162. The IPGW then repackages the data (e.g., as an IPsec communication), and routes the IPsec data communication, via the secure terrestrial links 166 (over the private network 152), to the corporate headquarters 162. In the corporate network scenario, a further example involves a corporate communications from the corporate headquarters to a number of remote sites (e.g., a multicast communication to STs 134*a*-134*n*)—where STs 134*a*-134*n* are correspondingly associated with the two IPGWs 148*a*(1) and 148*a*(5) (e.g., grouped between the two IPGWs based on load balancing and IPGW capabilities). In this scenario, a gateway or router, within the local network of corporate headquarters 162, transmits the data communication, via the secure terrestrial links 166 (over the private network 152), to the IPGWs 148*a*(1) and 148*a*(5). The IPGWs determine that the communication is destined for the remote STs 134*a*-134*n*, and package the data as a multicast communication addressed to the community of STs 134*a*-134*n*. The IPGWs then transmit the data communication, via the satellite 132, for decoding by the community of STs 134*a*-134*n*. Accordingly, the satellite of such a system acts as a bent pipe or repeater, transmitting communications between the STs 134*a*-134*n* and their respective associated IPGWs 148*a*-148*n*.

Bandwidth Reservation

The SIP protocol operates in a request-response manner, consisting of a three-way handshake. The calling terminal initiates a call by sending out an INVITE message to the called terminal. The called terminal receives the INVITE message and (if received correctly) sends a response message to the calling terminal. The calling terminal then sends an acknowledgment message back to the called terminal to complete the call-setup. A proxy along the SIP path can act on behalf of the calling terminal and/or the called terminal.

In wireless networks (e.g., a satellite network), due to the characteristics of bandwidth on demand, the wireless bandwidth needs to be established before the completion of SIP call-setup. There is a mechanism in SIP, namely Reliability of Provisional Responses (See, e.g., IETF RFC 3262, "Reliability of Provisional Responses in the Session Initiation Protocol (SIP)", June 2002), which can be used in delaying the call setup for bandwidth reservation. However, many SIP products for the wired network do not require this feature. To support a large variety of SIP terminals on the market, therefore, it is necessary for the network to provide a simple ubiquitous way for bandwidth reservation of broad types of SIP calls. The SIP signaling processes are described in further detail in the IETF publication RFC 3261, referenced above.

Figure 2:
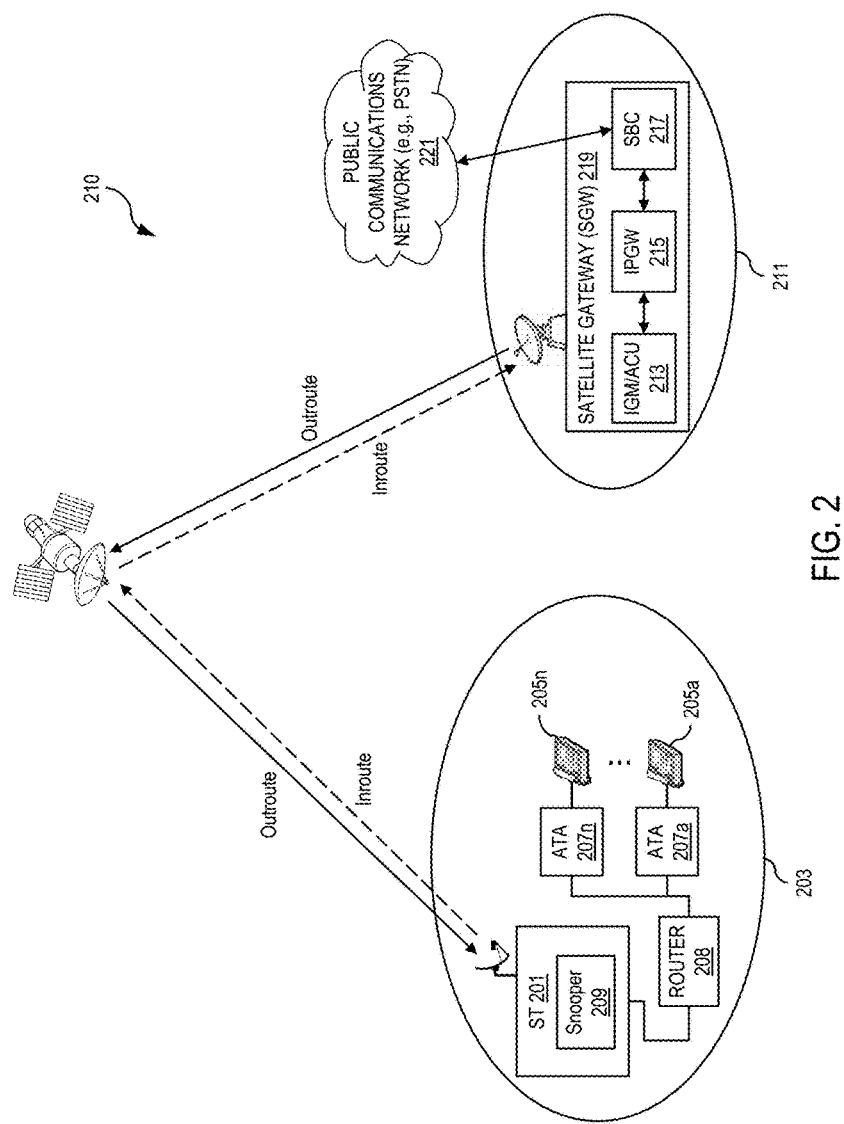
FIG. 2 illustrates a block diagram depicting a VOIP flow over the satellite of a broadband satellite system, in accordance with example embodiments of the present invention.

FIG. 2 illustrates a block diagram depicting a VOIP flow over the satellite of a broadband satellite system 210, in accordance with example embodiments of the present invention. With reference to FIG. 2, the model of VOIP flows at the inroute and outroute of the satellite network are illustrated. At the remote site 203, one or more analog telephones 205*a* . . . 205*n* and respective VOIP devices (e.g., Analogue Terminal Adapters (ATA) 207*a* . . . 207*n*) are connected to the remote terminal 201 (which connection may either be direct or via a customer-based router 208 performing network address translation (NAT) functions). The ATA connects traditional analog telephones, fax machines and similar devices to a digital telephone system or a voice over IP (VOIP) telephony network. The ATA provides dial tone and other standard telephone supervisory signaling to the connected customer-premise device. The digital interface of the ATA typically consists of an Ethernet port to connect to an IP network, but may also be a USB port for connecting the device to a personal computer. Each ATA may have an address assigned by the network, which may comprise a unique address; however, more generally the registration and NAT allows the assigned address to not necessarily be unique. Specifically, the ATA can be behind a NAT whereby private IP addresses may be assigned. According to example embodiments, the terminal 201 also includes a snooper 209 (or snooping function), which captures and parses SIP INVITE messages from both inroute and outroute directions.

At the gateway site 211, the satellite gateway (SGW) 219 comprises the IGM 213 (which, in accordance with example embodiments of the present invention includes an access control unit (ACU)), an IPGW 215 and a session border controller (SBC) 217. The SBC generally controls the signaling and usually also the media streams involved in setting up, conducting and tearing down calls or other interactive media communications. The "session" refers to a communication between two parties (e.g., in the context of telephony, a call). Each session generally comprises one or more signaling message exchanges that control the session, and one or more media streams that carry the session audio, video or other data along with information of call statistics and quality. In a sense, the SBC manages the data flows of sessions. In that regard, the SBC functions as a SIP proxy, performing media transcoding between VOIP peers over the network. For example, the SBC is the first SIP proxy from the terminal ATA point of view, which functions as a Server in responding to the SIP INVITE signal for a SIP call from the terminal ATA to the PSTN network, and as a Client on behalf of a PSTN call in sending an INVITE to the terminal ATA. A VOIP call session reserves bandwidth in both directions (particularly at the inroute) before the session can be established. Further, the SBC serves as the gateway between the remote ATAs and a public communications network 221 (e.g., a public switched telephone network (PSTN)). The ACU, together with the IGM, controls admission decisions on the inroute (discussed in further detail below with regard to admission control).

Figure 3A:
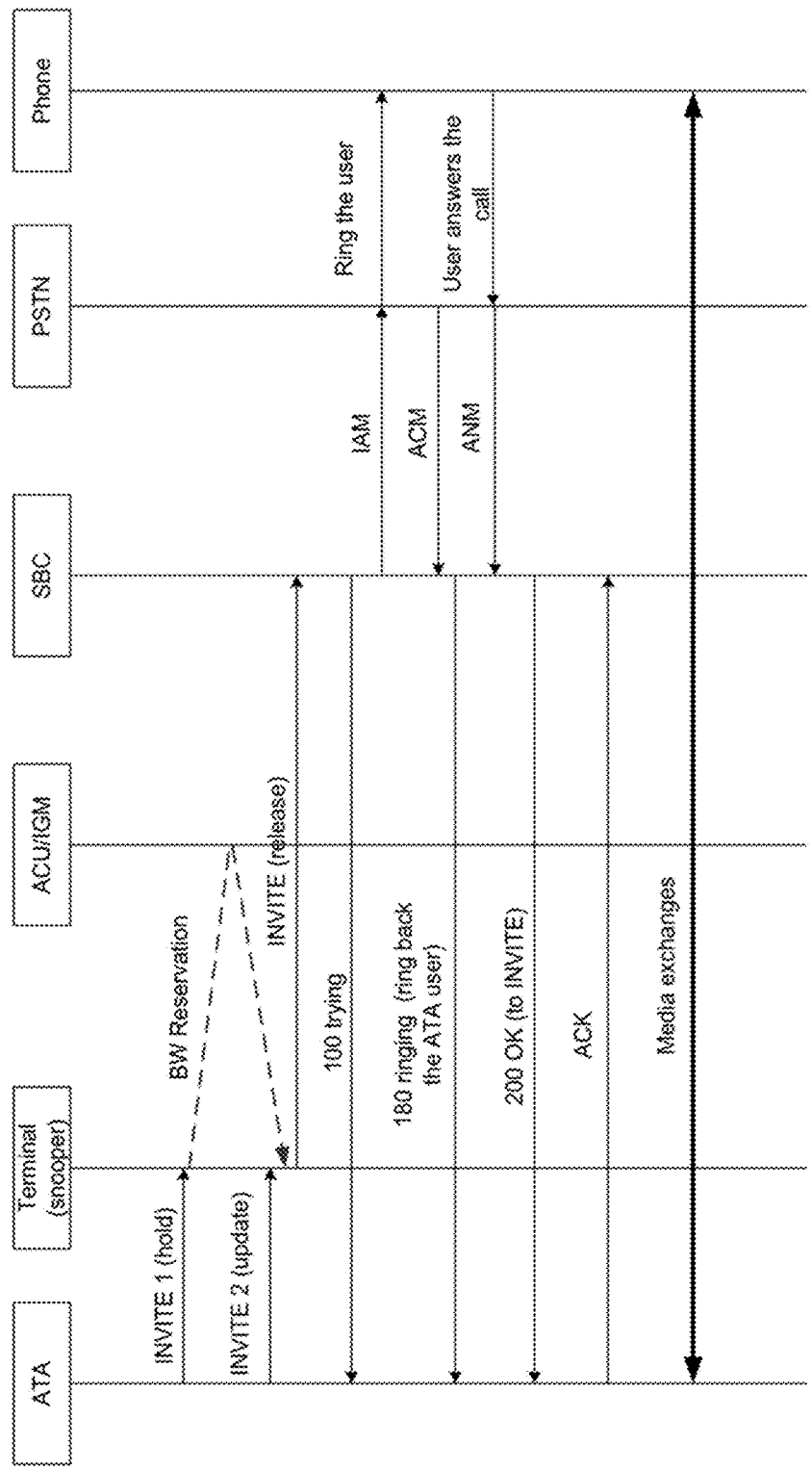
FIG. 3A illustrates a signaling diagram reflecting a SIP session from the ATA to the PSTN, in accordance with example embodiments of the present invention.

FIG. 3A illustrates a signaling diagram reflecting a SIP session from the ATA to the PSTN (outgoing session or call), in accordance with example embodiments of the present invention. By way of example, upon initiation of a session or call by the phone device 205*a*, the ATA sends out the first INVITE (INVITE 1). The snooper captures and parses the INVITE message, identifying a new call from an authorized user and the respective data rate. By way of example, the snooper directly parses every UDP packet from a designated source port and destination IP address of the SBC, and identifies the INVITE packet for initializing a call. The inroute is generally the point a bottlenecks and thus bandwidth needs to be reserved at the inroute before setting up a session. Accordingly, when the INVITE for a new call setup is detected by the snooper, the terminal holds the INVITE and initiates an inroute bandwidth reservation process with the IGM. If a further INVITE is received for the same session prior to the completion of the bandwidth reservation, the previous INVITE message may be replaced by the further invite message (where each successive invite message replaces the previous message for the same session until completion of the bandwidth reservation). For example, the snooper identifies the INVITE message based on session (or call) ID, which is globally unique between the ATA and the SBC. For illustration, it is assumed that VOIP traffic is of the highest priority and the respective bandwidth is available on the outroute. The terminal holds the INVITE and sends a bandwidth request to the Admission Control Unit (ACU). The ACU performs admission control for Constant Bit Rate (CBR) traffic (e.g., VOIP or other media traffic) by overseeing inroutes in multiple Inroute Groups. The ACU manages the Inroute Group at the beam level, meaning one ACU per beam. The ACU IP address is broadcast to the qualified terminals as part of provisioning.

More specifically, by way of example, the terminal snooping function and bandwidth reservation comprises the following process tasks. Note that, if the terminal is not subscribed for the provision of VOIP services, then the snooper function is not activated. The terminal receives and parses the SIP INVITE message (INVITE 1), and, because the INVITE message is also used as keep-alive signaling in SIP, the parser also differentiates between a new call and an existing call. The terminal determines the requested data rate by parsing the session description part of the INVITE. The terminal holds the received INVITE 1 message for the call-setup until the bandwidth reservation is completed. Prior to completion of the bandwidth reservation process, the snooper may receive a second INVITE message (INVITE 2)—where the snooper will then update the INVITE message by replacing the INVITE 1 message with the new INVITE 2 message. Once the bandwidth reservation is completed (e.g., when the terminal receives an ACK message or signal from the ACU), the held INVITE is released and sent to the SBC. In some cases, the bandwidth reservation process may be unsuccessful—e.g., due to (1) the loss of bandwidth reservation message, or (2) no available bandwidth at that time. In the event of an unsuccessful bandwidth reservation, the processes reinitiated in the bandwidth request is retransmitted by the terminal. By way of example, for reason (1), the retransmission occurs immediately, and for reason (2), the retransmission waits for a predetermined period of time. By way of further example, the request is retransmitted until a pre-defined maximum number of transmissions is reached. Further, based on configurable timer settings (T1 settings) in SIP, and the bandwidth request retransmission, if an INVITE is detected as a newly initiated INVITE message (e.g., the user puts down the phone and calls again), the retransmission timer of the bandwidth request should be re-initiated. The terminal maintains a call list of active VOIP sessions/invites, and requests bandwidth for each session given that the snooper is able to determine the INVITE for different devices/users at the terminal. Individual queues are maintained at the terminal per session, but the en-queued data can share the assigned bandwidth if a corresponding queue is empty. By way of further example, the bandwidth may be released based on one of the following events: (1) the snooper in the terminal detects a SIP BYE or CANCEL message; (2) the terminal detects that there is no activity in the corresponding queue for a predetermined period of time; (3) the IGM detects that there is no traffic at the corresponding assigned slots for a predetermined period of time (particularly for the case that the terminal is dead). For (1) and (2), the terminal sends a bandwidth release message to notify the ACU.

With regard to the SIP session set-up, the following illustrates scenarios of SIP signaling during the call-setup. By way of example, T1=500 ms is used as a default value by SIP, however, the scenario may differ when T1 is increased. Further description of the session timers in the SIP processes can be found in the publication IETF RFC 4028, "Session Timers in the Session Initiation Protocol (SIP)," April 2005. During the time of bandwidth reservation, if a retransmission of a previous INVITE or a new INVITE from the same user arrives, the terminal replaces the INVITE on-hold with the most recent one. With reference to FIG. 3A, INVITEs 1 and 2 are the first and second transmission, respectively. In receiving the bandwidth request, the ACU admits the call to a certain inroute (via the admission control procedure, further discussed below) that allocates constant bandwidth to the user given the resource is available. If the admission is granted, then the ACU informs the terminal of the decision. The IGM in the meanwhile allocates slots to the terminal for a particular inroute at the super frame basis. If no resource is available across the inroutes managed by the ACU, the request will be rejected.

Due to propagation and processing delay, the round trip time between the terminal and IGM is denoted as $T_{setup}$ (a typical value of $T_{setup}$ is 695 ms) for bandwidth reservation. Assume the timer T1=500 ms. In receiving the first INVITE, the terminal sends a bandwidth request to the ACU. A retransmitted INVITE could arrive before the completion of bandwidth reservation. When the channel is set up at the inroute, the on-hold INVITE is sent to the SBC. The SBC acts as a stateful proxy and responds with 100 TRYING to cease the INVITE request. The SBC sends an IAM (Initial Address Message) to the PSTN that rings the called phone. The ACM (Address Complete Message) in the PSTN is mapped to 180 ringing in SIP. The user answers the phone and an ANM (Answer Message) is sent from the PSTN to the SBC. The SBC sends 200 OK as mapping of ANM to response the INVITE. In receiving 200 OK, the ATA sends ACK to the SBC and starts the conversation.

Figure 3B:
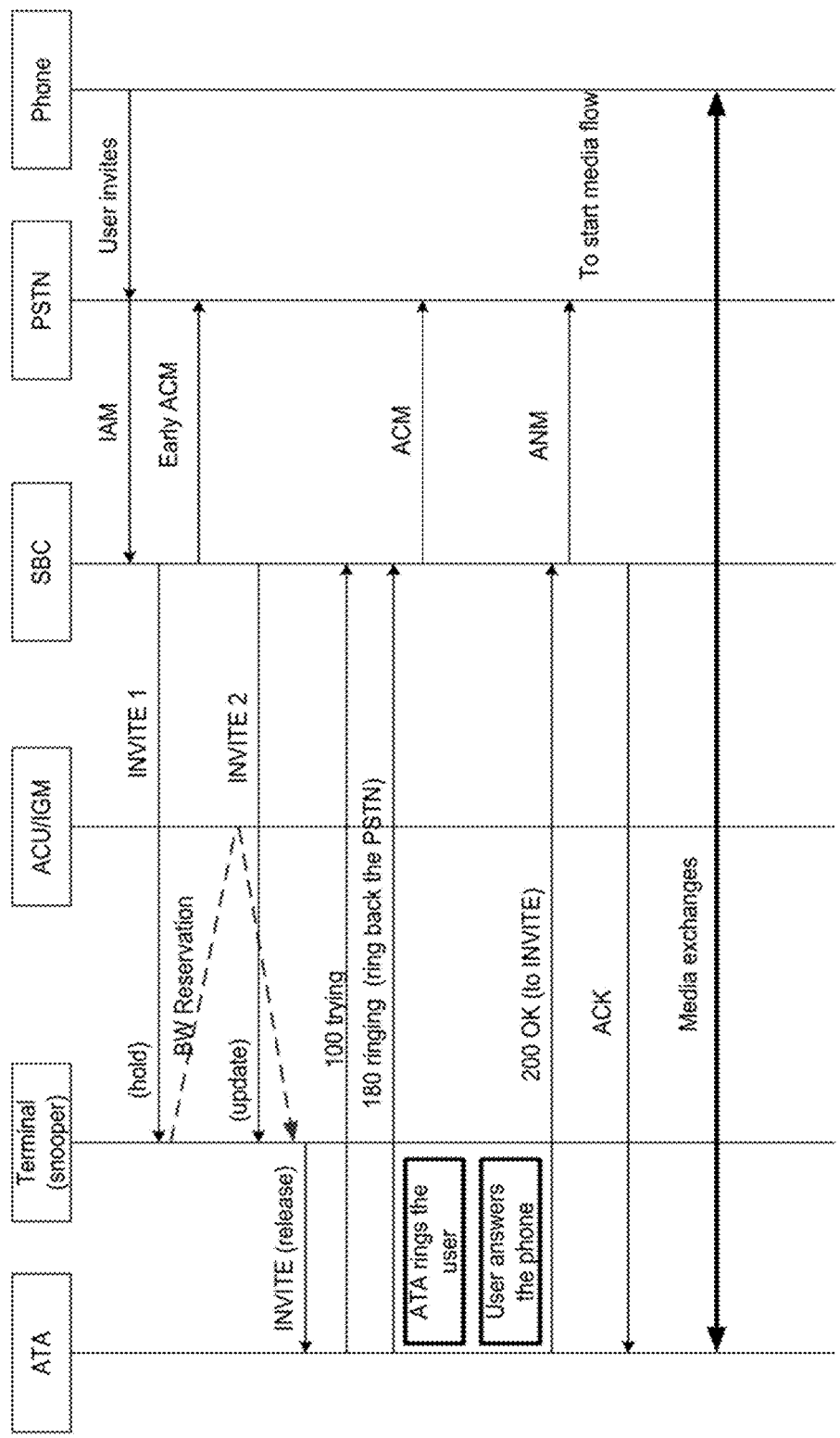
FIG. 3B illustrates a signaling diagram reflecting a SIP session from the PSTN to the ATA, in accordance with example embodiments of the present invention.

FIG. 3B illustrates a signaling diagram reflecting a SIP session from the PSTN to the ATA (incoming session or call), in accordance with example embodiments of the present invention. By way of example, the call is initiated by a phone in the PSTN. The SBC works as a stateful proxy and maps the IAM from the PSTN to SIP INVITE and accordingly transmits an INVITE message (INVITE 1) to the terminal. The SBC may respond to the PSTN with an Early ACM, meaning the call is in progress. The terminal receives the INVITE 1 message, and the snooper captures and parses the message, as discussed above with respect to an outgoing session. In receiving the first INVITE from the SBC on the outroute, the snooper initiates an in route bandwidth reservation process and sends a respective bandwidth request for the inroute direction. As with the outgoing call or session, here also, the terminal holds the INVITE 1 message for the call-setup until the bandwidth reservation is completed (and in the event the terminal receives further INVITE messages, the snooper updates the INVITE message to the current one). Due to performance concerns, downlink classification for pre-screening the VOIP packets at IPGW may be needed.

The terminal holds the received INVITEs if the channel is not set up. Assume the SBC uses the same default T1=500 ms. After $T_{setup}$, the inroute bandwidth allocation is granted. Again a second INVITE may replace the first one during the course of channel setup. In receiving the INVITE, the ATA sends 100 trying to cease INVITE followed by 180 ringing to the SBC and also rings the user phone. Consequently, the user answers the phone and the ATA sends the 200 OK as the response to the INVITE. The SBC maps the above SIP signals to PSTN signals. The SBC sends an ACK to the ATA to complete the SIP session.

According to further example embodiments, for incoming calls, as the traffic density on the outroute is much heavier than that on the inroute, packet classification may be provided at the SGW 219 to reduce the processing load of the terminal. By way of example, traffic classification is performed at the IPGW 215, whereby the incoming packets with the source IP address of the SBC and designated destination port are marked. Upon receipt, the terminal (snooper) processes the marked packets in an effort to identify the INVITE message from the SBC. The processing overhead of the terminal is thereby significantly reduced.

Figure 3C:
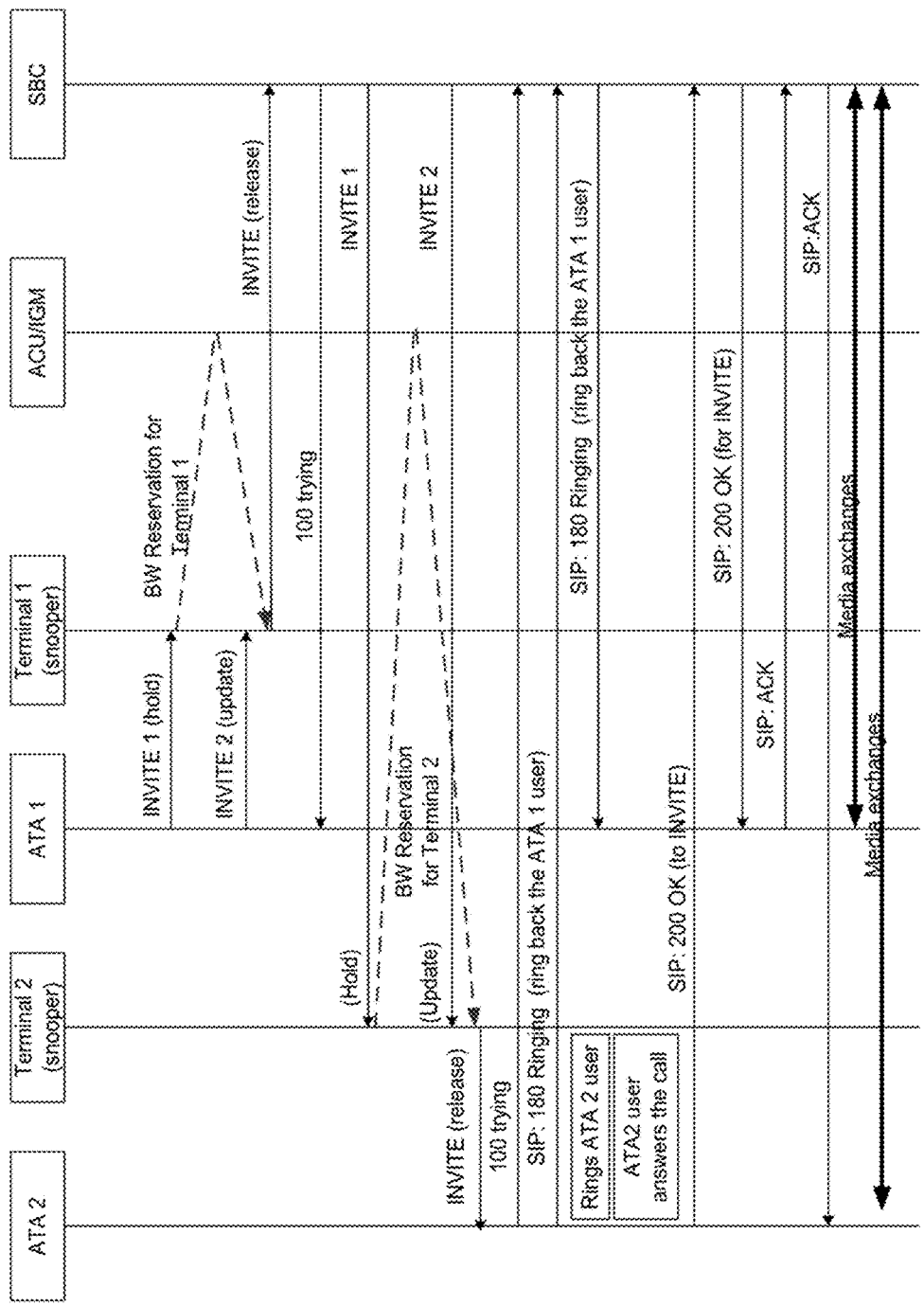
FIG. 3C illustrates a signaling diagram reflecting a SIP session from a first ATA to a second ATA, in accordance with example embodiments of the present invention.

FIG. 3C illustrates a signaling diagram reflecting a SIP session from a first ATA to a second ATA, in accordance with example embodiments of the present invention. In this scenario, the call is initiated by the ATA 1 at terminal 1 to the ATA 2 at the terminal 2. Similar to the above PSTN scenarios, the snooper at terminal 1 captures and parses the first INVITE message received from the ATA 1, and holds the INVITE 1 message while initiating the inroute bandwidth reservation process for the terminal 1. Upon completion of the bandwidth reservation process, the terminal 1 releases the current INVITE message and transmits the message to the SBC. Upon receipt of the INVITE message, the SBC sends the 100 trying signal to the ATA 1, and sends a first INVITE message to the terminal 2. The snooper at the terminal 2 captures and parses the INVITE 1 message received from the SBC, and holds the INVITE while initiating the inroute bandwidth reservation process for the terminal 2. The SBC will transmit and retransmit the INVITE on behalf of terminal 1, where the terminal 2 snooper holds and updates the respective INVITE messages until completion of the bandwidth reservation process for the terminal 2. Upon completion of the bandwidth reservation process for the terminal 2, the terminal 2 snooper releases the INVITE to the ATA 2. The ATA 2 sends the 100 trying signal to the SBC followed by the 180 ringing signal. Upon receiving the 180 ringing signal from the ATA 2, the SBC sends a 180 ringing signal (ring back to the ATA one caller) to the ATA 1. The ATA 2 rings user and the user answers the session call. Once the user answers the session call, the ATA 2 sends the SIP 200 OK to the SBC, and the SBC sends the SIP 200 OK signal to the ATA 1. The ATA 1 sends a SIP ACK message to the SBC, and the SBC sends a SIP ACK message to the ATA 2, to complete the SIP session setup. Once the SIP session setup is complete, media exchanges occur between the ATA 1 and the ATA 2 via the SBC.

In all of the above examples, timer T1=500 ms, two or three copies of the INVITE may arrive the call-setup. If the timer T1 is 2.0 or 4.0 seconds, which may be appropriately sufficient for one RTT including terrestrial and satellite links, then only one INVITE may be needed. Further optimization of the T1 value may also be based on other timers of the SIP protocol that may depend on T1.

The details regarding the SIP Session Description Protocol (SDP) are described in the above-referenced publication IETF RFC 4566. A SIP INVITE message contains a list of text-encoded header fields defining features such as who are the calling and called parties, the call identifier, the number of hops, etc. The complete set of SIP header fields is defined in Section 20 of the above-referenced publication IETF RFC 3261. Among them, Call-ID contains a globally unique identifier for this call, generated by the combination of a random string and the softphone's host name or IP address. The combination of the To tag, From tag, and Call-ID completely defines a peer-to-peer SIP relationship between the calling and called parties and is referred to as a dialog. The details of the session, such as the type of media, codec, or sampling rate, are not described using SIP. Rather, the body of a SIP message contains a description of the session, encoded in some other protocol format, typically the SDP.

The purpose of SDP is to convey information about media streams in RTP sessions to allow the recipients of an INVITE to participate in the session. Multicast-based sessions on the Internet allow those receiving the traffic can join the session unless the session traffic is encrypted. In such an environment, SDP serves two primary purposes. It is a way to communicate the existence of a session, and it is a means to convey sufficient information to enable joining and participating in the session. For a unicast case, only the latter purpose is relevant. An SDP session description is denoted by the media type "application/sdp" (as described in Section 8 of the publication IETF RFC 4566). An SDP session description is entirely textual using the ISO 10646 character set in UTF-8 encoding. The textual form was chosen to enhance portability, to enable a variety of transports to be used, and to allow flexible, text-based toolkits to be used to generate and process session descriptions.

An SDP session description consists of a number of lines of text of the form: ⟨type⟩=⟨value⟩, where ⟨type⟩ is one case-significant character and ⟨value⟩ is structured text whose format depends on ⟨type⟩ Among the SDP lists, two media level attributes, "m" and "a" fields, are used to identify the media type and further needed bandwidth for establishing the link. For example, the "m" field is the media description, having the format as m=⟨media⟩ ⟨port⟩ ⟨proto⟩ ⟨fmt⟩, where ⟨media⟩ is the media type (e.g., audio, video, text, application or message), ⟨port⟩ is the transport port to which the media stream is sent, ⟨proto⟩ is the transport protocol, and ⟨fmt⟩ is the media format description. For example, the field "m=audio 49170 RTP/AVP 0" means that the media type is audio, the destination port is port 49170, the protocol is real-time transport (RTP) protocol, and the Audio Video Payload (AVP) type is 0. The "a" field defines the attributes, having the format as a=⟨attribute⟩, a=⟨attribute⟩: value. Attributes can be of "session-level" or "media-level," or both. A media description may have any number of attributes ("a=" fields) that are media specific. They are media-level attributes. If attribute fields are added before the first media field, they are session-level attributes providing additional information that applies to the conference as a whole rather than to individual media. For example, the attribute field "a=recvonly" before the first "m=" field is a session-level attribute, indicating "receive only". The fields "m=audio 49170 RTP/AVP 0" and "m=video 51372 RTP/AVP 99" offer two media types, audio and video, with corresponding ports, protocol, and formats. The following field "a=rtpmap: 99 h263-1998/90000" is the attribute for the media type "video". The attribute "rtpmap" has the following format: a=rtpmap: ⟨payload type⟩ ⟨encoding name⟩/⟨clock rate⟩ [/⟨encoding parameters⟩]. This attribute maps from an RTP payload type number (as used in an "m=" line) to an encoding name denoting the payload format to be used. It also provides information on the clock rate and encoding parameters. It is a media-level attribute. The mapping of RTP payload type number and the corresponding encoding for audio and video are provided in Tables 4 and 5 of the publication IETF RFC 3551, "RTP Profile for Audio and Video Conference with Minimal Control," July 2003.

In accordance with example embodiments, the snooper at the terminal may be built with full features as a SIP proxy, or with the functions that can complete bandwidth reservation during call admission. By way of example, the snooper is configured in a phased procedure, with only the VOIP service considered at the initial phase. Generally, the snooper is embedded in the terminal. If a terminal is permitted for guaranteed VOIP service, the snooping function is turned on; otherwise, it is turned off. Two major tasks are completed by the snooper. First, the snooper needs to track each individual call of the terminal. Second, it needs to figure out the needed bandwidth for an individual call. By way of example, with regard to the first task, in a SIP session, the Call-ID is generated as a globally unique identifier to group together a series of messages. It is the same for all requests and responses sent by either user agent (UA) in a dialog. It is also the same in each registration from a UA. However, between multiple hops, the Call-ID may not be kept the same due to security reasons. In the certain satellite network, since the Session Border Controller (SBC) is the first proxy from the terminal ATA perspective, the Call-ID should be the same between the ATA and the SBC during a call. As for the second task, the snooper needs to parse the "m=" and "a=" fields of a session SDP in the INVITE and determines the needed bandwidth for the VOIP call. Tables 4 and 5 of the publication IETF RFC 3551 present the payload types and the corresponding encoding rates for different audio and video media. Among them, the audio and video types which are commonly used or likely adopted by the satellite services are elected with configurable parameters for the needed bandwidth (kpbs). The needed bandwidth for the audio and video media may be predetermined based on the payload and the overhead of the channel. The value of zero for requested bandwidth means the payload type is not supported.

In an INVITE message, the caller may provide several encoder offers and let the called party to choose one, typically when the caller is from the SBC. The called party answers the offer either via the SIP 200 OK (for INVITE) or a provisional ACK. Many VOIP service vendors use the former, i.e., to convey SDP via SIP 200 OK. In the satellite network, it is generally not feasible to parse 200 OK for the SDP answer in setting up the link, but it can be used to revise the established bandwidth. Therefore, the INVITE SDP is parsed to determine the needed bandwidth. If the offer has two or more audio types that are supported, the bandwidth request will choose whichever has the largest needed bandwidth. In general, only ONE audio type will be provided bandwidth for one call. The terminal will send amendment request if the established bandwidth is different from the final negotiation. A payload type may be configured with zero bandwidth if it is not supported in the network.

By way of example, two more columns may be used for the request bandwidth fitting the payload types of the Tables 4 and 5 of the publication IETF RFC 3551 to reflect the immediate bandwidth request and the amendment. The two columns are Request bandwidth for INVITE from the SBC ("from the SBC") and Request bandwidth for INVITE to the SBC ("to the SBC"). Both columns are pre-configured. For example, there are mainly two encoding types in service, G.729 for VOIP and G.711 for fax. The column of "from the SBC" is configured with G.729 bandwidth. The column of "to the SBC" is configured with the actual needed bandwidth. For incoming calls, the SIP proxy reads the column of "from the SBC", sending BW request based on G.729 (G.729's bandwidth is configured for all types). Once the link is set up, the SIP proxy reads the ATA response, looking at the column of "to the SBC". If it is G.729, not update is made; if it is G.711 (payload type 0 or type 8) or other type, the actual bandwidth is used in the update request. When the majority VOIP calls are using G.729, then no update message is needed. For outgoing calls, the SIP proxy reads the column of "to the SBC", sending the actual needed bandwidth in the request. When receiving a call with an unsupported CODEC, the SIP messages are just forwarded and no bandwidth request to ACU is generated.

By way of further example, the snooper keeps the status of each call using the variables given below in a table (Note releasing the bandwidth of an existing call is equivalent to sending a reduced Aggregate Bandwidth request):

For each call:
⟨Call — index⟩: created by the terminal;
⟨Call — ID⟩: obtained from parsing the INVITE message;
⟨Needed — bandwidth⟩ (kbps): obtained from parsing the INVITE SDP and a pre-configured mapping;
⟨Start — time⟩: the time when the bandwidth request is ACKed and accepted by the ACU;
⟨End — time⟩: the time when the request to release the bandwidth of an existing call is sent;
⟨Call — state⟩: active, hold, or inactive.
For all calls:
⟨Aggregate — bandwidth⟩ (kbps): the summation of total needed bandwidth for all calls in a terminal. This number is updated and sent to ACU based on the event that a new call arrives or an old call is released.

For example, there are two existing calls, each with data rate of 40 kbps. The current aggregate bandwidth is 80 kbps. A new call arrives with data rate of 50 kbps. The new aggregate bandwidth is 80+50=130 kbps. The terminal sends a bandwidth request message with 80 kbps for existing calls and 50 kbps for the new call. Similarly, if a 40 kbps call is released, the terminal sends out a request of 130 kbps for existing calls and (−40) for the new call. The unique Call-ID (or equivalent) will be in the message for the new call. As discussed later, the Admission Control Unit (ACU) may do book-keeping of all the individual calls, allowing a system level tracking for the real-time services.

There are scenarios where the INVITE with same Call-ID could be received multiple times by the snooper. One is the re-transmitted INVITE with SDP. Another is that INVITE is used as a keep-alive message between the two entities. In both cases, the Call-ID should be the same as the very original one, and thus the same bandwidth is allocated. In general, the snooper needs to compare the Call-ID in a newly received INVITE with that of active calls in the status table so that it won't request new bandwidth for an existing active call. There could also be the case that two parties negotiate a new media type during a call and needs different bandwidth. This situation is not covered for now in this SDD and may be updated in the future work.

According to further example embodiments, for unreliable transports (such as UDP), the requests are retransmitted at an interval that starts at T1 seconds and doubles after every retransmission. T1 is an estimate of the round-trip time with default value of 500 ms. Note this default setting is not targeted for a GEO satellite network. It can be further optimized for a satellite system, for example, T1=2 s or 4 s might be suitable for a GEO system. After receiving a 1xx response, any retransmissions cease altogether, and further responses are waited for. Typically, seven requests can be sent, equivalent to 64*T1 amount of time before the INVITE request is given up. Typically, a VOIP service provider may have users in both the terrestrial and satellite networks. The SBC may not have the knowledge of who is from a terrestrial terminal or a satellite terminal. If the timer in SBC is intact from the default, then the timer in ATA should be too.

Bandwidth Allocation

In accordance with example embodiments, at the return link or inroute of the satellite network, the given spectrum can form multiple inroutes with different symbol rates. By way of example, the symbol rate of an inroute can be 512, 1024, 2048, 4096, 6144 and 8192 Ksps. When a terminal requests bandwidth for a VOIP call or the aggregate bandwidth for multiple calls, the request is firstly placed at the Admission Control Unit (ACU). The ACU conducts admission control and Inroute Group selection, while the IGM performs inroute selection and slot allocation. The ACU oversees the load status of relevant Inroute Groups that can take VOIP calls and determines which IGM the call request is assigned to. Given the bandwidth request can be granted, the IGM performs slot allocation at an inroute periodically. By way of further example, with regard to Slot Allocation, in a typical satellite system, the physical layer (PHY) frame on the return link can be 45 ms, while the period of vocoder generated VOIP packets is 20 ms or 40 ms. Therefore, slot allocation every 45 ms is not appropriate. Instead, for example, a super frame of 360 ms, consisting of 8 PHY frames, may be employed.

A VOIP call needs a certain transmission rate to assure the quality of service (QoS) in terms of data rate and latency/jitter performance. A few challenges need to be addressed. First, a VOIP call may have different data rates and be transmitted at different coding rates due to varying channel condition over the satellite link. For example, in a system that employs adaptive coding and modulation (ACM), the code rate and modulation applied during a session may vary with changing channel conditions (e.g., under rain fade conditions the code rate and modulation may be modified to close the link). Accordingly, the required bandwidth (e.g., slots per frame) may vary during a session or call. Second, the PHY frame may not match appropriately with the VOIP packetization period. For example, the PHY frame may be 45 ms, whereas the packetization period may be a multiple of 10 ms (e.g., typically 20 ms or 40 ms). Third, an inroute needs to support a mix of traffic classes, including voice, interactive, streaming and bulk data. The slot allocation for VOIP data traffic must thereby be seamlessly incorporated with other data traffic classes. In this context, one way to do slot allocation for VOIP is to assign slots at fixed positions over the call duration. This method, however, presents a major drawback in that, as sessions are calls come and go, the slot space is left with many fractions, making it difficult to allocate bursts for other data traffic classes.

In accordance with example embodiments, therefore, Slot Allocation at the IGM is performed via a logical frame assignment employed on a superframe basis. According to example embodiments, therefore, where the goal may be to pack all the VOIP calls together and to dynamically allocate slots to a call, the slot position is allowed to change in the call duration. As the position changes for assigned slots, jitter may be introduced during a call. Such jitter introduced by the packing algorithm, however, is acceptable (especially with a high symbol rate inroute). Analysis and simulation indicates that dynamic slot allocation provides ample flexibility in efficiently utilizing the bandwidth for all traffic classes and satisfactory QoS for VOIP calls.

Figure 4:
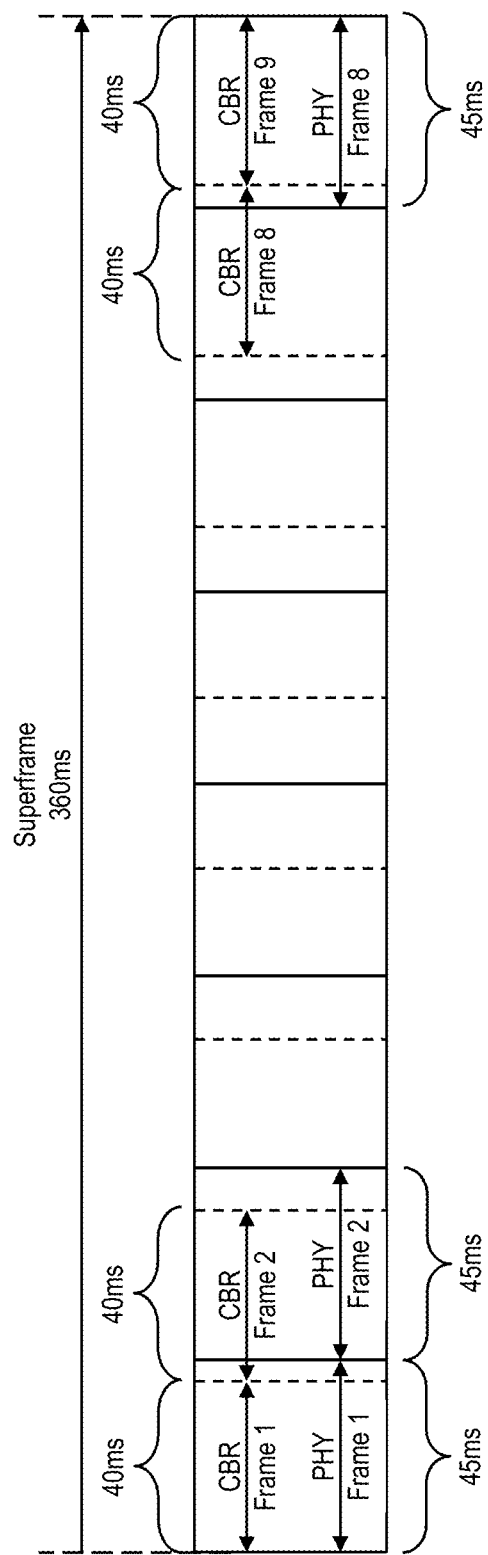
FIG. 4 illustrates the physical (PHY) and logical frames, in accordance with example embodiments of the present invention.

More specifically, by way of example, where the VOIP codec generates packets at intervals of every 20 ms or 40 ms, the slot allocation should also be of the same timing. According to one embodiment, therefore, VOIP slot allocations occur at 40 ms intervals. In this manner, one 40 ms PHY burst can fit one 40 ms packet or two 20 ms VOIP packets. Further, with a super frame of 360 ms and a PHY frame of 45 ms, one super frame consists eight 45 ms PHY frames and nine 40 ms timing periods. Based on this context, in the present embodiment, each 40 ms timing period of a super frame is adapted or utilized as a logical frame, or as the constant bit rate (CBR) frame. The slot allocation algorithm for VOIP traffic is thereby applied on a logical frame basis. FIG. 4 illustrates the physical (PHY) and logical frames, in accordance with example embodiments of the present invention. As shown in the figure, within a superframe of 360 ms, there are eight PHY frames (Frame 1, Frame 2, . . . , Frame 7). In the context of such a superframe, the slot or bandwidth assignment algorithm assigns bandwidth on the basis of a 40 ms logical frame (CBR frame). Accordingly, within the same superframe of 360 ms, CBR slot assignments can be allocated on the basis of a 40 ms CBR frame, where the superframe contains nine CBR frames (CBR Frame 1, CBR Frame 2, . . . , CBR Frame 8, CBR Frame 9).

By way of example, the PHY frame features of different symbol rates is tabulated in Table 1, and the respective features of each logical frame in a super frame is defined in Table 2. Note that if evenly distributed, a 40 ms logical frame may not have an integer number of slots. Thus in Table 3, the length of each logical frame in a superframe is defined with integer number of slots based on the start slot in Table 2. In each PHY frame, there are guard slots that cannot be used for allocation. Table 4 lists the guard slots for each PHY frame of different symbol rates. The guard slots start from the beginning of a PHY frame. The number of guard slots varies with different symbol rate. When allocating slots in a logical frame, the guard slots must be avoided.

TABLE 1

PHY frame of different symbol rates

| | Symbol Rate (Ksps) | | | | | |
|---|---|---|---|---|---|---|
| | 512 | 1024 | 2048 | 4096 | 6144 | 8192 |
| Slots per 45 ms Frame | 192 | 384 | 768 | 1536 | 2304 | 3072 |
| Slots per 40 ms logic frame | 170⅔ | 341⅓ | 682⅔ | 1365⅓ | 2048 | 2730⅔ |
| Slots per 360 ms super frame | 1536 | 3072 | 6144 | 12288 | 18432 | 24576 |
| start of PF 1 | 1 | 1 | 1 | 1 | 1 | 1 |
| start of PF 2 | 193 | 385 | 769 | 1537 | 2305 | 3073 |
| start of PF 3 | 385 | 769 | 1537 | 3073 | 4609 | 6145 |
| start of PF 4 | 577 | 1153 | 2305 | 4609 | 6913 | 9217 |
| start of PF 5 | 769 | 1537 | 3073 | 6145 | 9217 | 12289 |
| start of PF 6 | 961 | 1921 | 3841 | 7681 | 11521 | 15361 |
| start of PF 7 | 1153 | 2305 | 4609 | 9217 | 13825 | 18433 |
| start of PF 8 | 1345 | 2689 | 5377 | 10753 | 16129 | 21505 |
| end of PF 8 | 1536 | 3072 | 6144 | 12288 | 18432 | 24576 |

TABLE 2

Logical frame of different symbol rates

| | Symbol Rate (Ksps) | | | | | |
|---|---|---|---|---|---|---|
| | 512 | 1024 | 2048 | 4096 | 6144 | 8192 |
| start of LF 1 | 1 | 1 | 1 | 1 | 1 | 1 |
| start of LF 2 | 172 | 342 | 684 | 1366 | 2049 | 2732 |
| start of LF 3 | 342 | 684 | 1366 | 2732 | 4097 | 5462 |
| start of LF 4 | 513 | 1025 | 2049 | 4097 | 6145 | 8193 |
| start of LF 5 | 684 | 1366 | 2732 | 5462 | 8193 | 10924 |
| start of LF 6 | 854 | 1708 | 3414 | 6828 | 10241 | 13654 |
| start of LF 7 | 1025 | 2049 | 4097 | 8193 | 12289 | 16385 |
| start of LF 8 | 1196 | 2390 | 4780 | 9558 | 14337 | 19116 |
| start of LF 9 | 1366 | 2732 | 5462 | 10924 | 16385 | 21846 |
| end of LF9 | 1536 | 3072 | 6144 | 12288 | 18432 | 24576 |

TABLE 3

Length of logical frames

| | Symbol Rate (Ksps) | | | | | |
|---|---|---|---|---|---|---|
| | 512 | 1024 | 2048 | 4096 | 6144 | 8192 |
| Length of LF 1 | 171 | 341 | 683 | 1365 | 2048 | 2731 |
| Length of LF 2 | 170 | 342 | 682 | 1366 | 2048 | 2730 |
| Length of LF 3 | 171 | 341 | 683 | 1365 | 2048 | 2731 |
| Length of LF 4 | 171 | 341 | 683 | 1365 | 2048 | 2731 |
| Length of LF 5 | 170 | 342 | 682 | 1366 | 2048 | 2730 |
| Length of LF 6 | 171 | 341 | 683 | 1365 | 2048 | 2731 |
| Length of LF 7 | 171 | 341 | 683 | 1365 | 2048 | 2731 |
| Length of LF 8 | 170 | 342 | 682 | 1366 | 2048 | 2730 |
| Length of LF 9 | 171 | 341 | 683 | 1365 | 2048 | 2731 |
| end of LF9 | 1536 | 3072 | 6144 | 12288 | 18432 | 24576 |

TABLE 4

Guard slots for different symbol rate

| | Symbol Rate (Ksps) | | | | | |
|---|---|---|---|---|---|---|
| | 512 | 1024 | 2048 | 4096 | 6144 | 8192 |
| Number of guard slots per PHY frame | 1 | 1 | 2 | 3 | 3 | 4 |
| guard slots of PF 1 | 1 | 1 | 1, 2 | 1, 2, 3 | 1, 2, 3 | 1, 2, 3, 4 |
| guard slots of PF 2 | 193 | 385 | 769, 770 | 1537, 1538, 1539 | 2305, 2306, 2307 | 3073, 3074, 3075, 3076 |
| guard slots of PF 3 | 385 | 769 | 1537, 1538 | 3073, 3074, 3075 | 4609, 4610, 4611 | 6145, 6146, 6147, 6148 |
| guard slots of PF 4 | 577 | 1153 | 2305, 2306 | 4609, 4610, 4611 | 6913, 6914, 6915 | 9217, 9218, 9219, 9220 |
| guard slots of PF 5 | 769 | 1537 | 3073, 3074 | 6145, 6146, 6147 | 9217, 9218, 9219 | 12289, 12290, 12291, 12292 |
| guard slots of PF 6 | 961 | 1921 | 3841, 3842 | 7681, 7682, 7683 | 11521, 11522, 11523 | 15361, 15362, 15363, 15364 |
| guard slots of PF 7 | 1153 | 2305 | 4609, 4610 | 9217, 9218, 9219 | 13825, 13826, 13827 | 18433, 18434, 18435, 18436 |
| guard slots of PF 8 | 1345 | 2689 | 5377, 5378 | 10753, 10754, 10755 | 16129, 16130, 16131 | 21505, 21506, 21507, 21508 |
| end of PF 8 | 1536 | 3072 | 6144 | 12288 | 18432 | 24576 |
| end of LF 9 | 1536 | 3072 | 6144 | 12288 | 18432 | 24576 |

In accordance with further example embodiments, Slot Allocation for VOIP calls comprises two algorithms. The first algorithm is queue management of terminals with active calls. The second one is slot allocation for VOIP based on the terminal queue. Both algorithms are based on that a terminal with VOIP has been assigned to a certain inroute.

In accordance with such embodiments, with regard to terminal queue management, the IGM manages a list of terminal queues as a linked list of terminals that have active VOIP calls within a particular inroute, where each node of the linked list represents a terminal, and the requested CBR bandwidth for a terminal is the value associated with the respective node. The requested bandwidth of a terminal may be the aggregated value of multiple calls. The queue management by the IGM is performed via allocation of the slot resources to satisfy the needed aggregate bandwidth of calls of one single terminal (instead of management or allocation of the resources on a call-by-call basis).

Figure 5A:
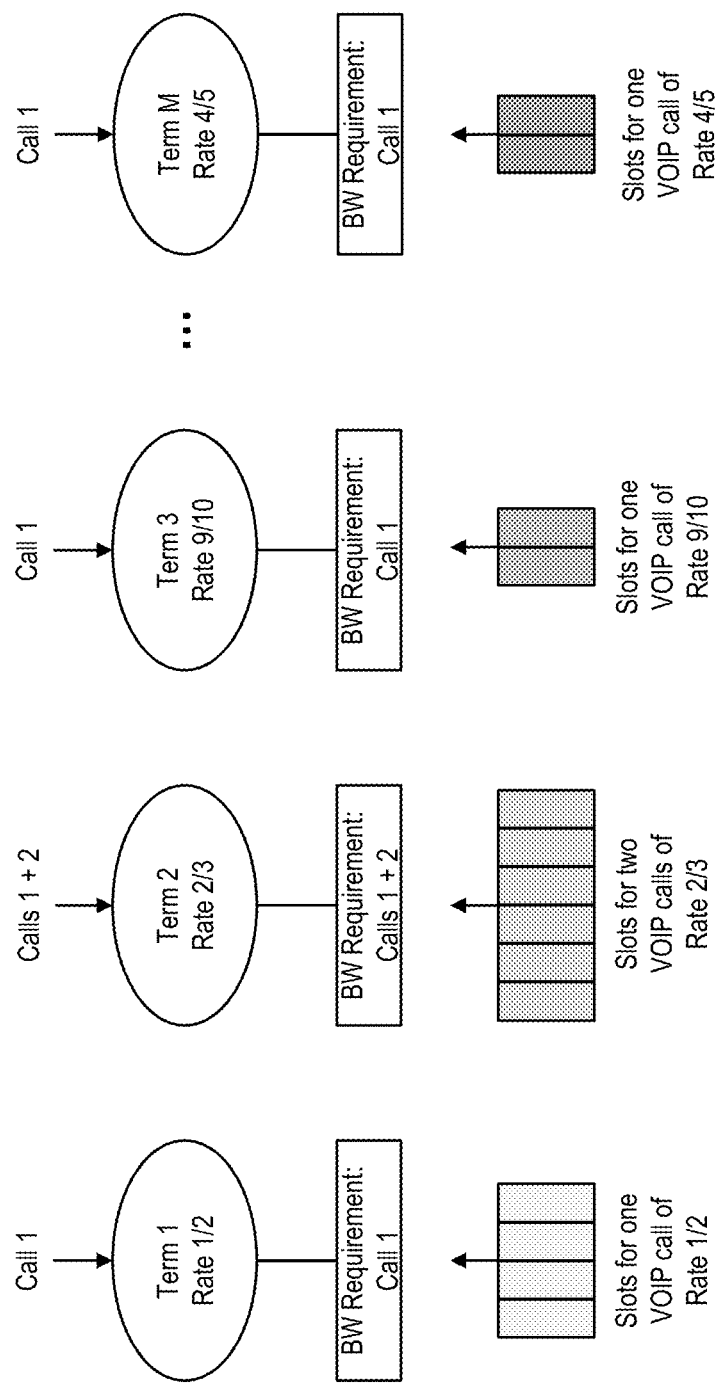
FIG. 5A illustrates en-queuing of terminals in a Terminal Queue, in accordance with example embodiments of the present invention.

In accordance with one such embodiment, terminal queue management is as follows. A terminal queue is formed based on the admission time of a first VOIP call of the respective terminal—the terminal is en-queued as a node for the CBR slot allocation process. A terminal with a new call is always added to the end of the queue. In the event that subsequent calls arrive at an existing terminal, the aggregated bandwidth would be updated by a new request from the terminal to the ACU. Based on that new request, the IGM adds the additional bandwidth requirement on top of the current value of the terminal node or queue. FIG. 5A illustrates enqueuing of terminals in a Terminal Queue, in accordance with example embodiments of the present invention. In Error! Reference source not found., the arriving order of terminals is Term 1, Term 2, Term 3, . . . , Term M. As depicted, each of Term 1, Term 2, Term 3, . . . , Term M has one call at the rates 1/2, 2/3, 9/10, . . . , 4/5, respectively, and is allocated bandwidth slots per terminal queue as illustrated. The new call 2 arrives at the Term 2, in the bandwidth for the new call 2 is added to the queue for terminal 2. Even though the call 2 of terminal 2 may arrive later than call 1 of terminal 3, for example, its bandwidth is still aggregated with the bandwidth for call 1 of the terminal 2. In this sense the IGM thereby addresses the aggregate bandwidth requests on a per terminal basis and not a per call basis. In other words, the IGM manages CBR bandwidth requirements on a per terminal basis, where the aggregate CBR requirement of each terminal is addressed on the terminal queue basis, where the aggregate CBR requirement of each terminal addresses all CBR sessions of the respective terminal. The IGM then allocates CBR slots on a per terminal queue basis.

In further accordance with such embodiments, when all active sessions of a particular terminal are released, the terminal must be de-queued or released from the CBR terminal queue. As long as calls exist, no matter how many of them are in and out of the terminal, the terminal stays in the terminal queue.

Figure 5B:
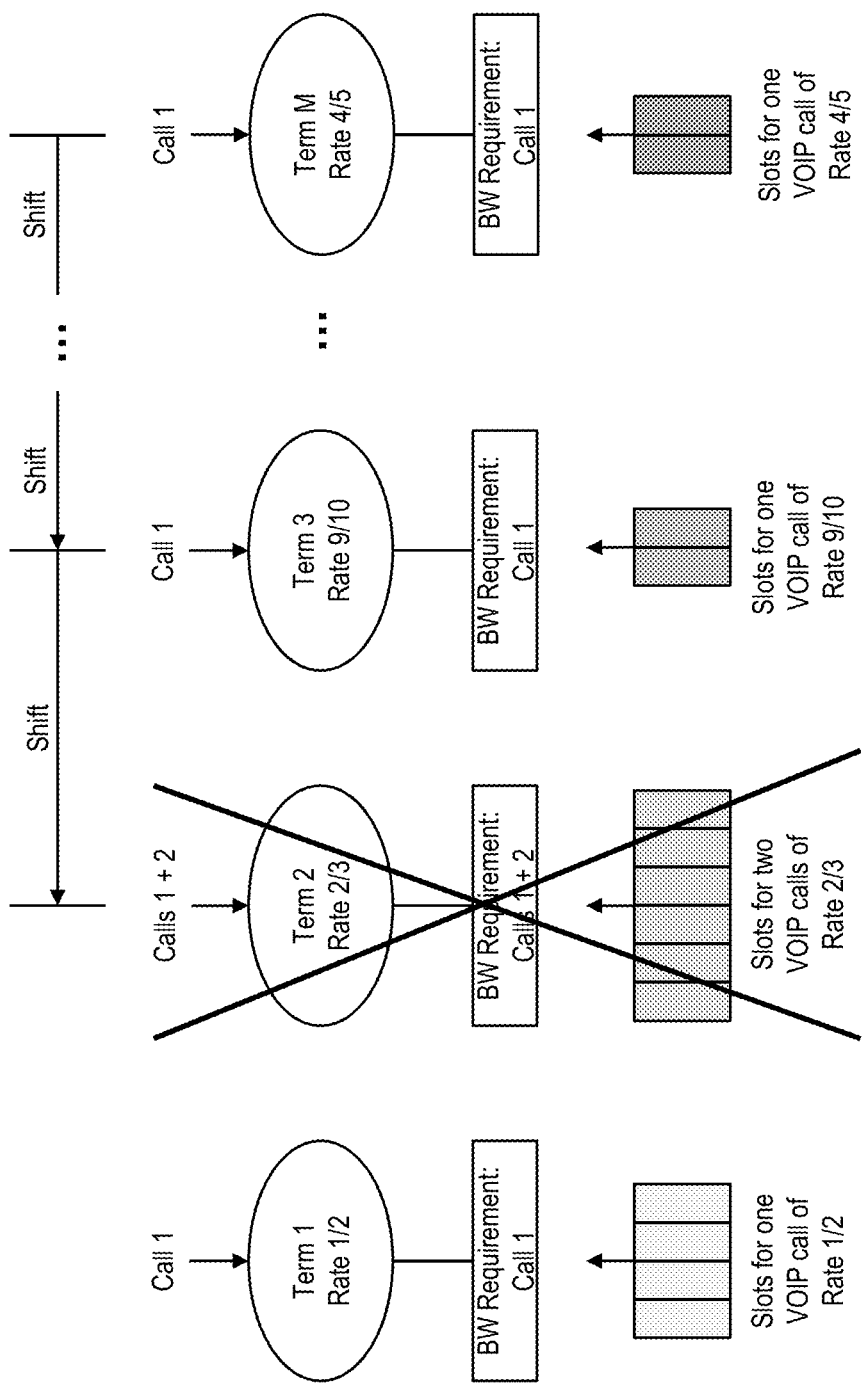
FIG. 5B illustrates de-queuing of a terminal from the Terminal Queue with Passive Update, in accordance with example embodiments of the present invention.

According to a first embodiment for de-queuing, a terminal is de-queued from the terminal queue in a passive fashion (a Passive Update). FIG. 5B illustrates de-queuing of a terminal from the Terminal Queue with Passive Update, in accordance with example embodiments of the present invention. When a terminal (with VOIP calls) is released, all other terminals stay in the same position within the terminal queue, and shift forward or up to fill the gap of the released terminal. Accordingly, with regard to the slot allocation for the remaining terminals, the CBR slot positions allocated to each terminal (behind the released terminal) shift forward by the number of logical frames formerly allocated to the released terminal (by the number of slots of the released call(s)).

Figure 5C:
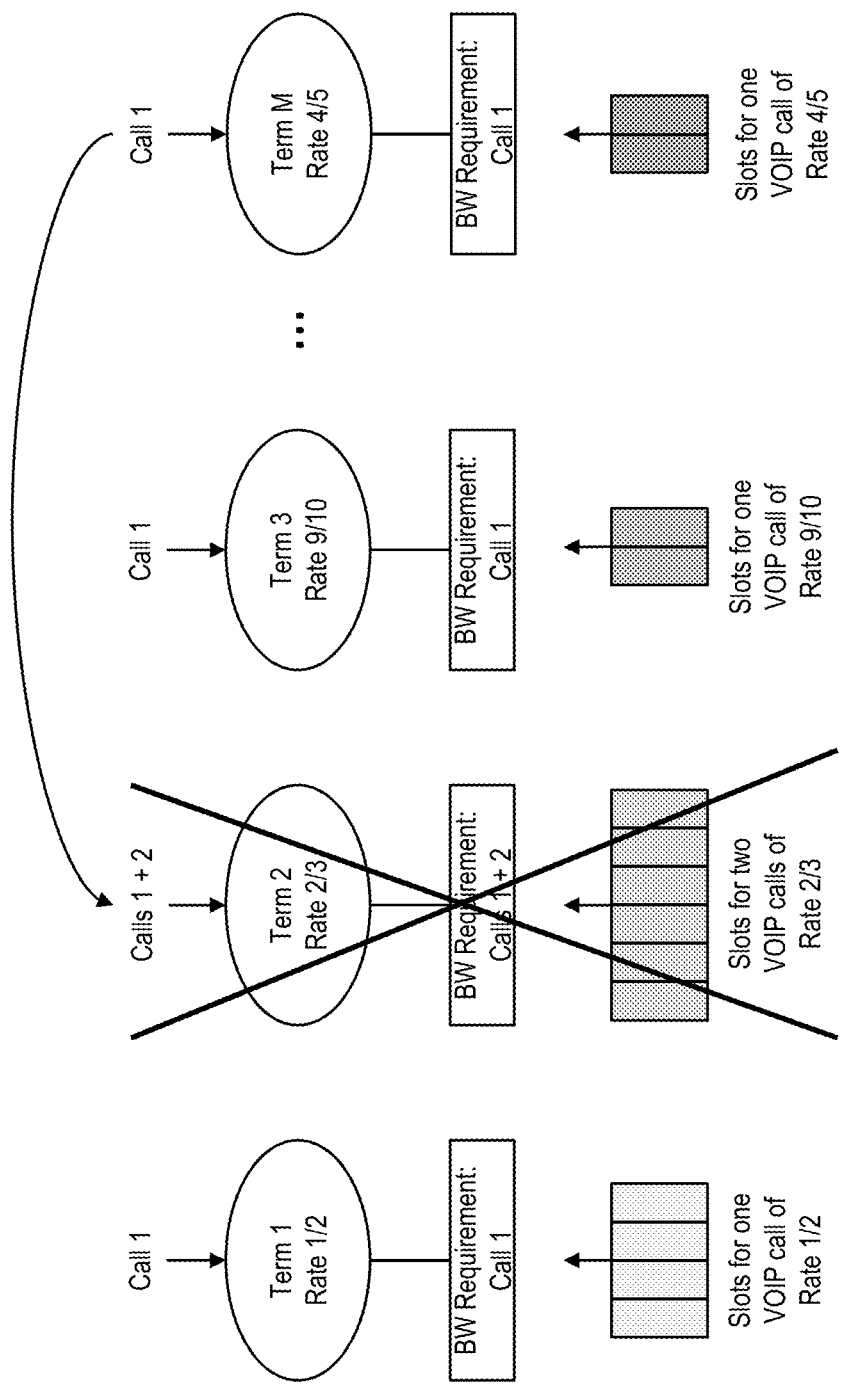
FIG. 5C illustrates de-queuing of a terminal from the Terminal Queue with Active Update, in accordance with example embodiments of the present invention.

According to a first embodiment for de-queuing, a terminal is de-queued from the terminal queue in an active fashion (an Active Update). FIG. 5C illustrates de-queuing of a terminal from the Terminal Queue with Active Update, in accordance with example embodiments of the present invention. If releasing a call results in the release of a terminal, then the terminal at the very end of the terminal queue is moved forward to fill the space. If a call is released but the terminal is still in queue due to other calls, then no action is taken with respect to the queue structure. The only resulting change would be an update of the requested bandwidth by the terminal with the released call, and respective reduction in slot allocations to the respective terminal queue. If the terminal at the very end has multiple calls, then all calls will be moved together with the terminal to fulfill the released place.

With the passive option, as the average duration of a call is longer than the inter-arrival time of incoming calls, a terminal at the end of the queue will ultimately be moved to the front of the queue. If the admission is reasonably conservative, the average jitter introduced by such movement is about 20 ms. The worst case could be up to 40 ms. In addition, each terminal may experience multiple position moves during the call. Alternatively, active option requires some queue operation. The queue operation can introduce about 20 ms jitter and the worst case could also be up to 40 ms. Such jitter can be absorbed by an inactive period of a call. In both options, the queueing operation does not count the modulation and coding scheme applied to the terminal, as well as the number of slots needed to match the data rate, which simplifies the operation. Table 5 shows the jitter introduced due to the release of a call. The results are based on 35.5 kbps VOIP call with listed coding rate given a certain symbol rate. The number of slots per burst is also different for different coding rate.

TABLE 5

Duration of a VOIP Burst w/Different Symbol Rate (ms)

| (slots per burst) | Symbol Rate (Ksps) | | | |
| --- | --- | --- | --- | --- |
|  | Rate 1/2 12 | Rate 2/3 9 | Rate 4/5 8 | Rate 9/10 7 |
| 512 | 2.81 | 2.11 | 1.88 | 1.64 |
| 1024 | 1.41 | 1.05 | 0.94 | 0.82 |
| 2048 | 0.70 | 0.53 | 0.47 | 0.41 |
| 4096 | 0.35 | 0.26 | 0.23 | 0.21 |
| 6144 | 0.23 | 0.18 | 0.16 | 0.14 |
| 8192 | 0.18 | 0.13 | 0.12 | 0.10 |

VOIP data rate: 35.5 kbps, symbols per slot: 120

Figure 6:
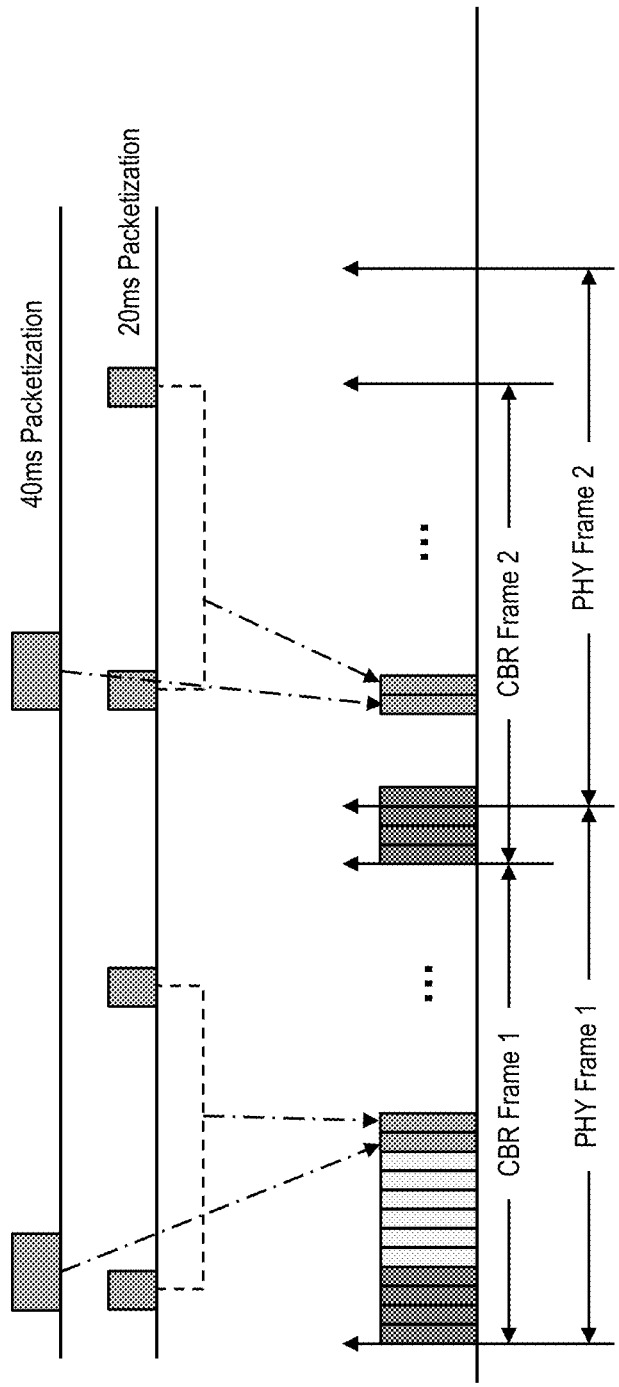
FIG. 6 illustrates a slot packing algorithm for VOIP calls, in accordance with example embodiments of the present invention.

In accordance with further example embodiments, a slot packing algorithm is applied whereby a VOIP call is assigned bandwidth (e.g., a PHY burst in terms of several slots) in each logical frame to match the packetization period. FIG. 6 illustrates a slot packing algorithm for VOIP calls, in accordance with example embodiments of the present invention As shown in the figure, for 40 ms packetization, one VOIP packet forms one MAC layer packet before being put into the PHY burst; for 20 ms packetization, two VOIP packets are combined at the MAC layer and then put into the PHY burst. The number of slots in a PHY burst may vary for different terminals due to the coding rate and the required data of a call. The PHY bursts are packed back to back, on a terminal queue basis (for each terminal queue), from the beginning of a logical frame until all the calls of the respective terminal queue are assigned bandwidth. Gaps may exist in the event that a burst cannot fit the space due to limitations of burst size, guard slots, etc.

According to one embodiment, the slot allocation/packing algorithm is performed as follows. VOIP slots are packed on super frame basis→a call or session is assigned slots every logical frame of a super frame. VOIP slot packing is performed in a sequential order based on the order of the terminal queue list (e.g., managed by the IGM), from beginning to the end, whereby, if a terminal has multiple calls, then the slots for all calls of the terminal allocated/packed together. In this context, first, based on the symbol rate, the starting slot of logical frames and PHY guard slots in a super frame are predetermined. Then, for each terminal queue, the aggregate number of requested/required slots is determined based on coding rate, the required data rate, etc. By way of example, the applied code rate in allocating slots can be set at one level higher (e.g., more robust) than the current code rate of a terminal. The requested bandwidth is based on an aggregate data rate and it is converted to the needed number of slots at a certain code rate. The slots are allocated/packed back-to-back in each logical frame based on the terminal queue, such that no PHY frame boundary crossing occurs for logical frames 1 and 9 (although logical frame boundary crossing may occur for other logical/CBR frames). Further, the slots are allocated to a session/call, avoiding the crossing the guard slots. For example, if the size of a burst needs to cross the guard slots, then two bursts will be assigned counting the overhead. For example, suppose the size of a burst is six slots, and the space is five slots to a guard slot, the overhead of forming two bursts is two slots for the six-slot burst, then two bursts, one is five slots (before the guard slot), the other is (1+2)=3 slots, will be formed for the terminal. A burst is subject to the minimum burst size. The assigned/allocated slots are marked based on the respective terminal IDs. The remaining slots are used for other data traffic classes (VOIP/video calls have usage limit for an inroute that is imposed at the admission control).

The terminal requests inroute bandwidth from IGM and keeps tracking the status of VOIP/CBR calls. At Layer 2, the terminal maintains individual queues for each VOIP/CBR call. Each queue is labeled by audio (A), video (V) or audio+video (AV). At every 40 ms, the terminal de-queues the individual queues based on the order A→V/AV in a circular Round Robin way. As the terminal knows the needed data rate of each call (queue), it schedules equivalent amount of data of 40 ms based on such data rate. A second pass in scheduling is needed if there are available slots and data in CBR queues. The IGM allocation in turn may assign/allocate slots to a terminal with mixed data types without notifying which slot is for what traffic. The VOIP/CBR traffic is generally of a higher priority than other traffic types for available slots. The terminal uses 45 ms PHY frame (not 40 ms logical frame) in scheduling the CBR data, meaning a CBR queue may be scheduled twice in a 45 ms duration. Data may also arrive twice in a CBR queue. The default threshold for tail dropping is 80 ms and 200 ms for a VOIP and a video (V or AV) queue, respectively. The packets in queue that is longer than the threshold will be dropped.

Admission Control

As introduced above, in accordance with example embodiments, the Admission Control Unit (ACU) controls the admission of VOIP calls across multiple IGMs (Inroute Group Managers). The admission control unit (ACU) oversees multiple inroutes with symbol rates ranging from 512 ksps to 8192 Ksps. The admission limit (VOIP limit) for each type of inroute per symbol rate can be pre-calculated. According to one embodiment, the calculation of the admission limit is based on the number of slots in one logical frame, the required data transmission rate for applicable audio payload types, the most conservative coding rate and a margin to allow the gap when a burst crosses the guard slots. It may also be based on a certain usage limitation on VOIP per inroute. By way of example, $N_{LF}$ denotes the number of slots per logical frame, $N_{gap}$ denotes the number of slots for the gap allowance, $N_{guard}$ denotes the number of guard slots, and $N_{VOIP}$ denotes the required number of slots for a typical VOIP (with the most conservative code rate). Further, $\beta_0$ denotes the pre-defined bandwidth usage for VOIP, and C denotes the VOIP limit (unit: one VOIP call). The calculation for the VOIP limit may be performed as follows:

$$C = \text{Floor}\left[\frac{N_{LF} - N_{gap} - N_{guard}}{N_{VOIP}} \cdot \beta_0\right],$$

where $N_{LF}$, $N_{gap}$, and $N_{guard}$ are fixed and symbol-rate dependent, $\beta_0$ is configurable with a range of [0, 1.0], and $N_{VOIP}$ is also configurable subject to the required data rate and the FEC code rate. By way of example, the default value for $N_{VOIP}$ is 12, as per Table 55. Table 6 lists the number of VOIPs with 35.5 kbps and code rate 1/2 can be supported for different symbol rate when an inroute is fully used by VOIPs.

TABLE 6

VOIP Admission Limit for an Inroute

| | Symbol Rate (Ksps) | | | | | |
|---|---|---|---|---|---|---|
| | 512 | 1024 | 2048 | 4096 | 6144 | 8192 |
| Number of slots of a logical frame (lower bound) | 170 | 341 | 682 | 1365 | 2048 | 2730 |
| Allowance for gap in crossing PHY boundary | 11 | 11 | 11 | 11 | 11 | 11 |
| Number of guard slots | 1 | 1 | 2 | 3 | 3 | 4 |
| Number of usable slots | 158 | 329 | 669 | 1351 | 2034 | 2715 |
| Number of VOIP (35.5 kbps) supported with Rate 1/2 | 13 | 27 | 55 | 112 | 169 | 226 |

The calculation of VOIP usage can be based on either a slot or the bandwidth (BW) usage calculation, where $\beta_{SLOT}$ and $\beta_{BW}$ denote the slot and bandwidth based VOIP usage, respectively. By way of example, the slot based usage can be determined based on the ratio of the number of VOIP used slots and the number of available slots for VOIP, on a logical or super frame basis, which can be expressed as (where the slots assigned for Aloha usage should be excluded from the denominator):

$$\beta_{SLOT} = \frac{\textit{No. of slots assigned for VOIP (CBR) per logical or super frame}}{\text{Total } \textit{no. } \text{of slots for } \textit{VOIP (CBR)} \text{ per logical or super frame}}.$$

By way of further example, the bandwidth based usage can be determined based on the ratio of the assigned bandwidth (in Kbps) and the total available bandwidth for VOIP (in Kbps) (where the conversion of slots to Kbps is based on the most conservative code rate, i.e., rate 1/2, on either the logical or super frame basis), which can be expressed as:

$$\beta_{BW} = \frac{\text{Total assigned bandwidth for } \textit{VOIP (CBR)} \text{ in } \textit{Kbps}}{\text{Total available bandwidth for } \textit{VOIP (CBR)} \text{ in } \textit{Kbps}}.$$

The slot-based usage is calculated based on the actual code rate while the bandwidth-based usage based on the most conservative code, thus the latter is more conservative. Further, the conservative method may better accommodate for varying channel conditions during a session/call. The VOIP usage limit is pre-configured to allow other traffic classes to use the bandwidth. By way of example, a typical default value for heavily loaded data and VOIP inroutes is 0.30 and 0.70, respectively. The VOIP usage in terms of bandwidth would be easy to use as different SIP calls (audio or video) have different required data rates. In some cases, such as Inroute Group transition due to the channel condition changes, the VOIP usage limit should be more than the default threshold as the calls in a terminal doing Inroute Group transition are of higher priority than new calls. For this purpose, we introduce the Tolerance of VOIP usage limit with default value being 0.20.

Figure 7:
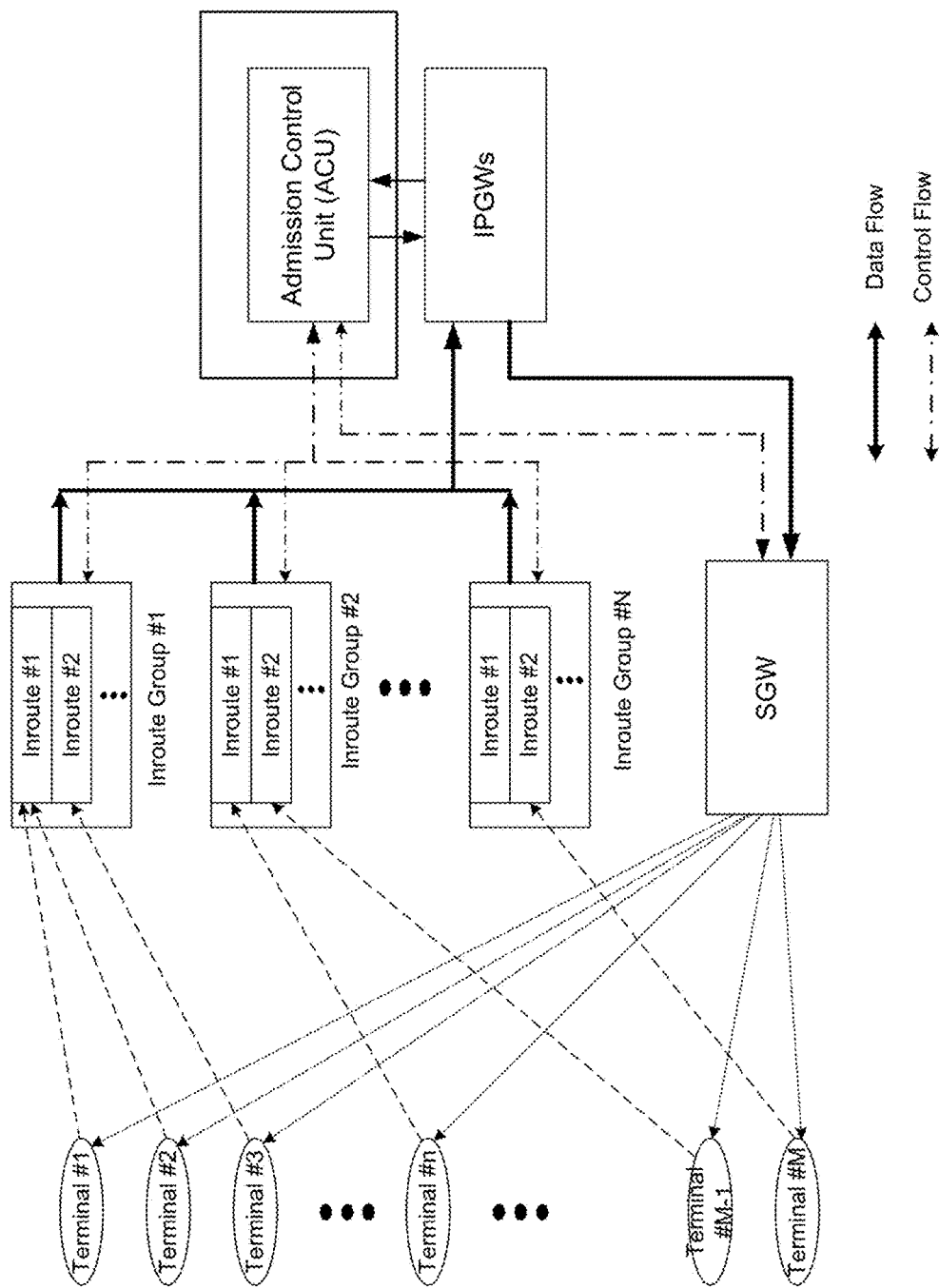
FIG. 7 illustrates an example call admission procedure, in accordance with example embodiments of the present invention.

FIG. 7 illustrates an example call admission procedure, in accordance with example embodiments of the present invention. The admission control unit (ACU) may be located at the satellite gateway (SGW) 219, as depicted in FIG. 2. The ACU manages VOIP/CBR call admissions. The ACU may have a unique IP address, via which the terminals can access the ACU through the management path (Control Flow). The IP address may be either multi-cast to the terminals by the ACU, or transmitted via the management path as other control messages. A terminal sends a call admission request to the ACU using the ACU IP address. The admission request may comprise a request for the required bandwidth for one call or an aggregate bandwidth request for multiple calls. In the request, the terminal sends both the current aggregate bandwidth of VOIPs, as well as the new request for admission. In this sense, both the ACU and the terminal can book-keep individual calls. The ACU communicates the updated aggregate bandwidth to the IGM for slot allocation.

The ACU oversees multiple Inroute Groups, while a respective Inroute Group Manager (IGM) manages a corresponding Inroute Group. The IGM updates the usage of VOIP in this Inroute Group, i.e., the percentage of VOIP usage in terms of bandwidth or slots, namely VOIP usage report. The IGMs update such information to the ACU periodically or as needed (e.g., on an event basis). For example, if there is a call admitted or released, the update information is sent to the ACU by the IGM. In addition, as the VOIP call slot assignment and release is at the super frame basis, the updating period can be one or several super frames. If no message synchronization is achieved among IGMs and the ACU, then a smaller period may be used. In addition to CBR usage report, the IGM may also report the non-CBR usage report (in terms of slot usage) to the ACU in assisting the admission, particularly when breaking the tie of same CBR usage. There are two limits for the VOIP calls. One is the regular admission limit, denoted by U1, which is confined by the pre-defined VOIP usage; the other is U2, for special cases such as Inroute Group translation when a tolerance is added on top of the regular usage limit.

According to example embodiments, the admission control procedure involves three parties (ACU, IGM and terminal) interacting with each other. The ACU or IGM broadcasts the updated VOIP (CBR) bandwidth usage of different Inroute Groups to the terminals. Learning the VOIP usage, a terminal ingresses the network by selecting an Inroute Group with the least bandwidth usage. Upon receiving the bandwidth request, the ACU may accept or reject the request. If accepting it, the ACU passes the request to the terminal selected IGM for bandwidth allocation. The IGM acknowledges the ACU whether the request is satisfied and bandwidth can be allocated. The IGM should grant this request from the ACU unless granting the request is physically infeasible. Upon receiving the decision from the IGM, the ACU sends an acceptance or rejection notice to the terminal.

At the remote side, the terminal makes autonomous decision in Inroute Group selection based on the broadcast VOIP usage. At the Gateway side, there are two levels of admission operation. At the first level, the ACU makes admission and conveys the call request to an IGM; at the second level, the IGM assigns the call to a specific inroute for slot allocation. The ACU needs to know not only the VOIP usage of an Inroute Group, but other traffic usage.

According to one such embodiment, the Admission Control Procedures for the terminal. The terminal tracks the advertised VOIP/CBR bandwidth usage of Inroute Groups and the Inroute Group it chooses to be placed. The terminal determines the needed bandwidth for a new call and the aggregate data rate for all the calls (where the terminal is also responsible for the IP overhead (e.g., IP header overhead, which can be predetermined). If not associated, the terminal selects the Inroute Group with the least VOIP/CBR bandwidth usage and sends bandwidth request. If associated already (with or without existing VOIP), the terminal sends the bandwidth request of the aggregate data rate of all existing plus new calls, when a new call arrives or an existing call leaves. The terminal may update the required bandwidth periodically. The terminal bandwidth request message may include (a) a request of a new call, a call release, a renegotiation or an Inroute Group transition, (b) the data rate for a new or released call or renegotiation, (c) the Call-ID for the new or released calls (Call-IDs for inroute group transition), (d) the session type (e.g., audio (A), or a video (V) or audio+video (AV)), (e) the aggregate data rate for all existing calls, and/or (f) the Inroute Group in which the terminal chooses to be placed. The terminal determines the completion of a call based on SIP messages (such as BYE, CANCEL, etc.), or the idle time of the corresponding CBR queue. The bandwidth reservation request may be transmitted for a configurable amount of times until a successful acknowledgement from ACU is received or a pre-defined time-out. When a call/session is received with an unsupported CODEC, the SIP messages are just forwarded and no bandwidth request to the ACU is generated.

According to one such embodiment, the Admission Control Procedures for the ACU are as follows. The ACU keeps and updates the following status of each Inroute Group: (1) the current VOIP/CBR bandwidth usage calculated based on data rate or the slot usage (where usage calculations based on data rate and slot usage are the same if using the most conservative code rate); (2) the current aggregate data rate of VOIP/CBR for each terminal and the code rate in the Inroute Group; (3) the aggregate data rate (Kbps) for each terminal; (4) Call-ID and data rate for each call/session; (5) the number of calls with each terminal. The ACU makes an admission decision based on the newly calculated VOIP usage $\beta_{new}$, the threshold limit for regular admission $\beta_0$, and the tolerance $\delta$. For a regular new request, if $\beta_{new} \leq \beta_0$, the request is accepted; otherwise, it is rejected. Note, not accepting an aggregate request doesn't mean to reject the entire data rate, only the increase part of the data rate is rejected. For an Inroute Group transition request, if $\beta_{new} \leq \beta_0 + \delta$, the request is accepted; otherwise, it is rejected. Note the rejection means the inroute transition is not accepted for all the VOIP calls in the terminal. If two candidate Inroute Groups have the same CBR usage, then the ACU breaks the tie using the non-CBR usage. If the non-CBR usage is also the same, ACU randomly chooses one. If accepted, the ACU passes the request to IGM if accepted; otherwise, the ACU sends a rejection notice of the new call to the terminal. If the IGM acknowledges the acceptance of the new request, the ACU sends an admission notice of the new call to the terminal; otherwise, the ACU sends a rejection notice. If a new call is rejected, the existing allocated bandwidth should persist. Further the ACU conducts the Inroute Group transition. When receiving an Inroute Group transition request, the ACU needs to arrange the terminal in the targeted Inroute Group and notifies the current serving Inroute Group.

According to one such embodiment, the Admission Control Procedures for the IGM are as follows. The IGM calculates the VOIP usage for each inroute as well as the overall CBR usage in the Inroute Group. The IGM may also calculate the non-CBR usage of an individual inroute and the overall Inroute Group. The IGM reports these two metrics to the ACU periodically and/or as needed (on an event basis, as discussed above). If the bandwidth request is from a terminal for a first CBR session, then the IGM assigns the terminal to an inroute with the least VOIP bandwidth usage, regardless other traffic types of the terminal or the inroute. If the bandwidth request is from a terminal with existing active CBR sessions already associated with an inroute, then the IGM assigns slots to satisfy the request in the current inroute. Alternatively, if the current inroute cannot support the additional bandwidth requirements, the IGM may transition the terminal to a new inroute to meet the aggregate demand of the terminal. If the IGM cannot allocate slots to meet the request, then the IGM rejects the request (e.g., the request for bandwidth for a new call). The IGM acknowledges the ACU whether the request (for a new call) is ultimately accepted or not. If a new call is rejected, the existing allocated bandwidth should persist. When admitted in an inroute, the requested bandwidth of the new call or new terminal is added to aggregate bandwidth of the terminal in the terminal queue per the slot allocation algorithm.

There may be policies that limit the total amount of bandwidth assigned to one terminal, which policies may be configurable subject to terminal type and its rate plan. The ACU generally applies the bandwidth limiting policies beam-wide, while the terminal may also employ self-policing.

Figure 8A:
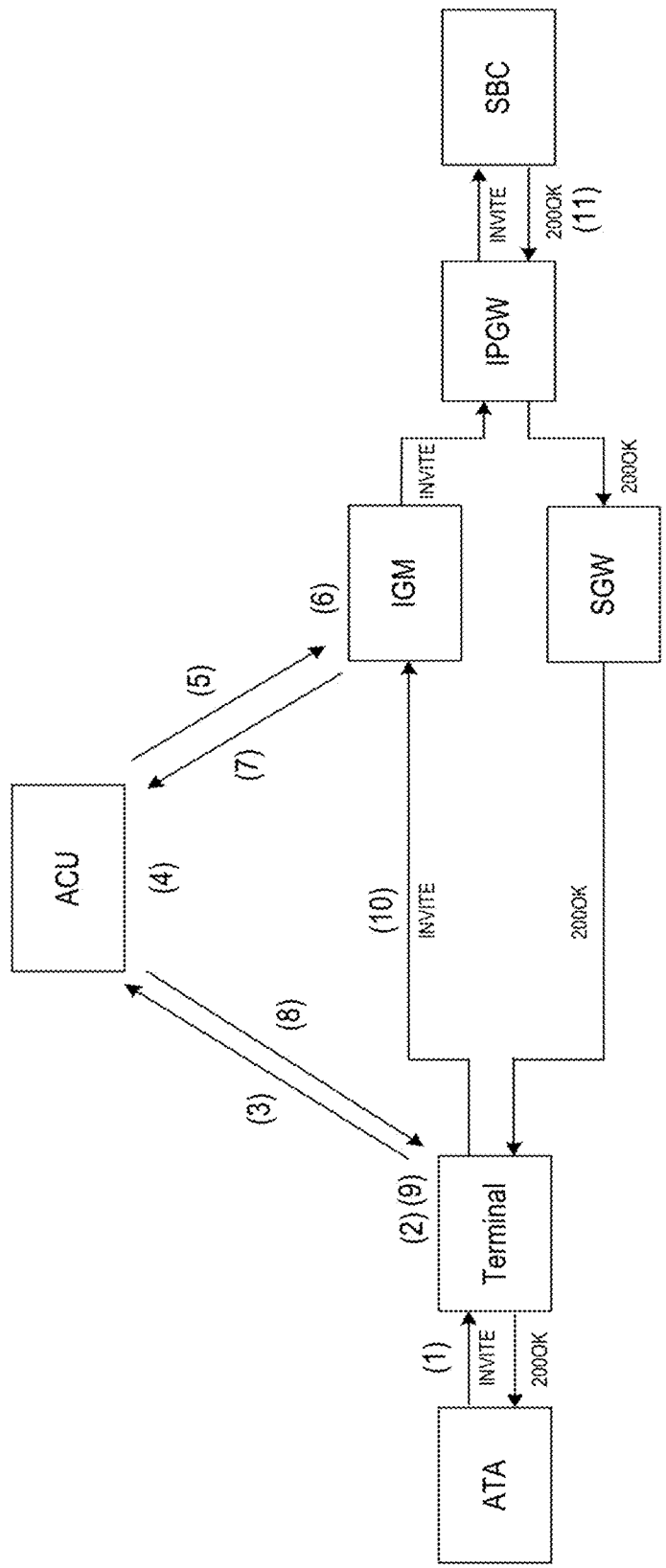
FIG. 8A illustrates an example process for Admission for an Outgoing Call, in accordance with example embodiments of the present invention.

FIG. 8A illustrates an example process for Admission for an Outgoing Call, in accordance with example embodiments of the present invention, as follows:

(1) The ATA sends out an SIP INVITE;
(2) The Snooper at the terminal holds the INVITE, and the Snooper parses the INVITE SDP to find out the media type (audio, video or audio+video), the payload type, and the needed bandwidth;
(3) The terminal sends out bandwidth request to the Admission Control Unit (ACU), indicating whether it is a new session or an inroute group transition request, and also indicating the chosen Inroute Group for the request;
(4) The ACU checks the status of the CBR usage of the terminal-designated Inroute Group, and proceeds based on the following:
  (a) if the CBR request is for a new session, then if the admission threshold U1 is not exceeded, go to step (5); otherwise, if the admission threshold U1 is exceeded, the ACU generates a rejection message and the process proceeds to step (8);
  (b) if the CBR request is for an inroute group transition (e.g., symbol rate goes down), then if the admission threshold U2=U1+tolerance is not exceeded, go to step (5); otherwise if the admission threshold U2 is exceeded, the ACU generates a rejection message and the process proceeds to step (8);
(5) The ACU assigns the CBR request to the IGM;
(6) The IGM assigns slots to the request if bandwidth is available; otherwise the request is rejected;
(7) The IGM acknowledges the ACU whether the bandwidth can be allocated;
(8) The ACU notifies the terminal whether or not the session/call is accepted;
(9) If the session/call is accepted, the held INVITE packet is moved to the CBR queue at the terminal; otherwise, the INVITE is dropped;
(10) When bandwidth is available, the INVITE is sent to the SBC, and finally to the called party; and
(11) The called party responds to the INVITE with 200 OK when accepting the INVITE, and the 200 OK is forwarded to the ATA by the SBC (the SBC does not generate the 200 OK).

Figure 8B:
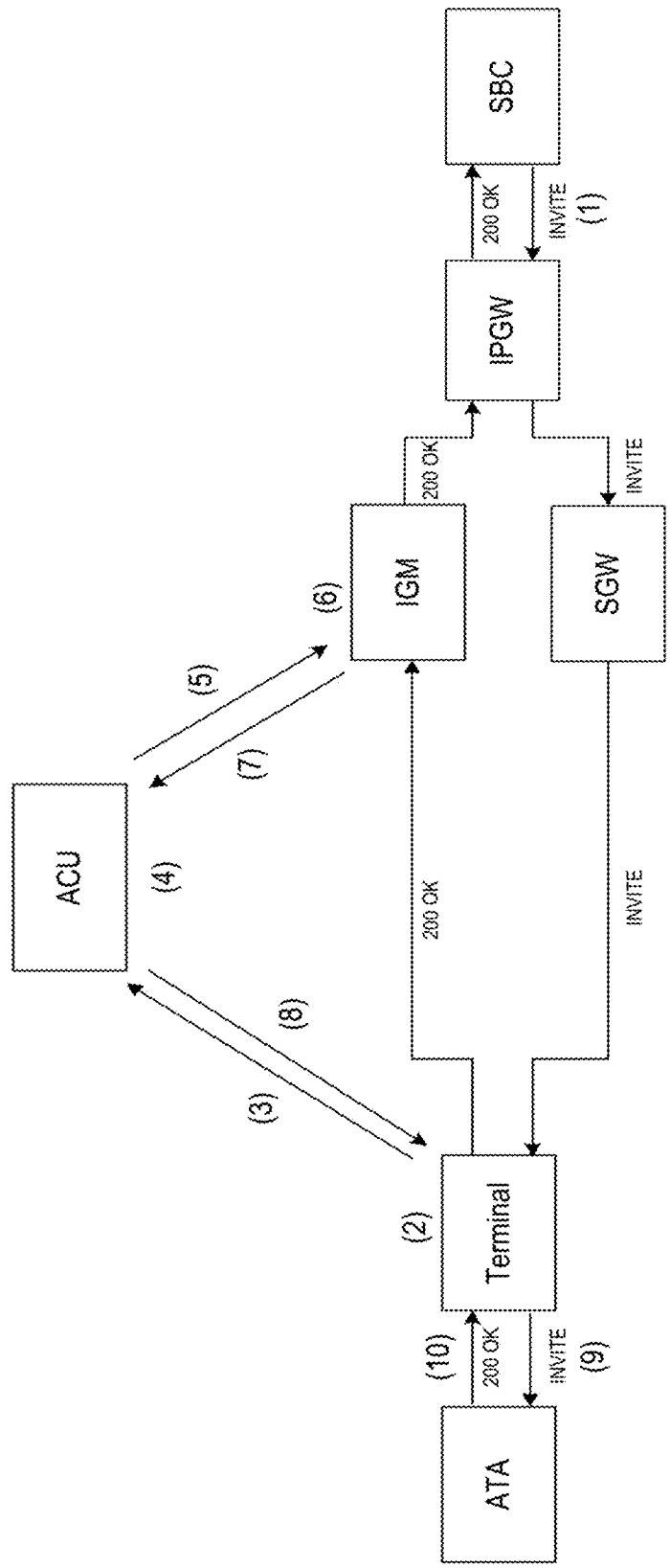
FIG. 8B illustrates an example process for Admission for an Incoming Call, in accordance with example embodiments of the present invention.

FIG. 8B illustrates an example process for Admission for an Incoming Call, in accordance with example embodiments of the present invention, as follows:

(1) The SBC sends out an SIP INVITE on behalf of the calling party;
(2) The Snooper at the terminal holds the INVITE when receiving it, and the Snooper parses the INVITE SDP to find out the media type (audio, video or audio+video), the payload type, and the needed bandwidth;
(3) The terminal sends out bandwidth request to the Admission Control Unit (ACU), indicating whether it is a new session or an inroute group transition request, and also indicating the chosen Inroute Group for the request;
(4) The ACU checks the status of the CBR usage of the terminal-designated Inroute Group, and proceeds based on the following:
  (a) if the CBR request is for a new session, then if the admission threshold U1 is not exceeded, go to step (5); otherwise if the admission threshold U1 is exceeded, the ACU generates a rejection message and the process proceeds to step (8);
  (b) if the CBR request is for an inroute group transition (e.g., symbol rate goes down), then if the admission threshold U2=U1+tolerance is not exceeded, go to step (5); otherwise if the admission threshold U2 is exceeded, the ACU generates a rejection message and the process proceeds to step (8);
(5) The ACU assigns the CBR request to the IGM;
(6) The IGM assigns slots to the request if bandwidth is available; otherwise the request is rejected;
(7) The IGM acknowledges to the ACU whether the bandwidth can be allocated;
(8) The ACU notifies the terminal whether or not the session/call is accepted;
(9) If the call is accepted, the held INVITE packet is released to the ATA; otherwise, the INVITE is dropped.
(10) If the user accepts the call, the ATA sends out a 200 OK message to the SBC (and finally to the calling party) in response to the INVITE.

Moreover, with regard to Message Synchronization and Call Tracking, a terminal may receive multiple call requests from multiple associated ATAs. Due to the long propagation delay and channel errors in the satellite system, there could be inconsistencies in the calculation of the aggregate bandwidth, as these back-to-back requests may arrive at the ACU in a different order than that they are sent. In accordance with example embodiments, two solutions may be employed for such scenarios. According to a first such solution, the terminal sends the session/call requests out one-by-one, holding each subsequent request until the prior request is completed (e.g., based on receipt of an ACK message or based on a time-out). The terminal also makes corresponding adjustments on the aggregate bandwidth upon receiving an ACK (but need not make any bandwidth change on a time-out). According to a second such solution, the ACU performs radio resource management during admission. By way of example, the ACU maintains a similar table for each terminal (see the table below), matching each Call-ID for each call whenever a request is received for the call setup or release. If a request from the terminal is missing, it won't affect current bandwidth allocation. Thus, the table at the ACU is more accurate. In addition, it is beneficial for call tracking, billing and debugging, as well as call preemption.

| User ID | Call-ID | Bandwidth (kbps) | Payload Type | Start time | End time | Cause of release |
|---|---|---|---|---|---|---|
| ATA #1 | xxxx | 40 | Audio | xxx | xxx | Inactivity |
| ATA #2 | xxxx | 40 | Audio | xxx | xxx | Inactivity |
| ATA #3 | xxxx | 150 | Video | xxx | xxx | Reboot |
| Aggregate BW (active calls) | | 230 | | | | |

At the ACU, for both solutions, the ACU negotiates the bandwidth request with the IGM one request at a time, even if multiple requests arrive at the ACU at the same time. As the ACU overrides the calculation of aggregate bandwidth, it calls for the reliable message in call release. The first solution is suitable for a small number of ATAs (e.g., 2 to 4) associated with a terminal, whereas the second solution may be required for a greater number of ATAs, e.g., 10+.

Figure 9A:
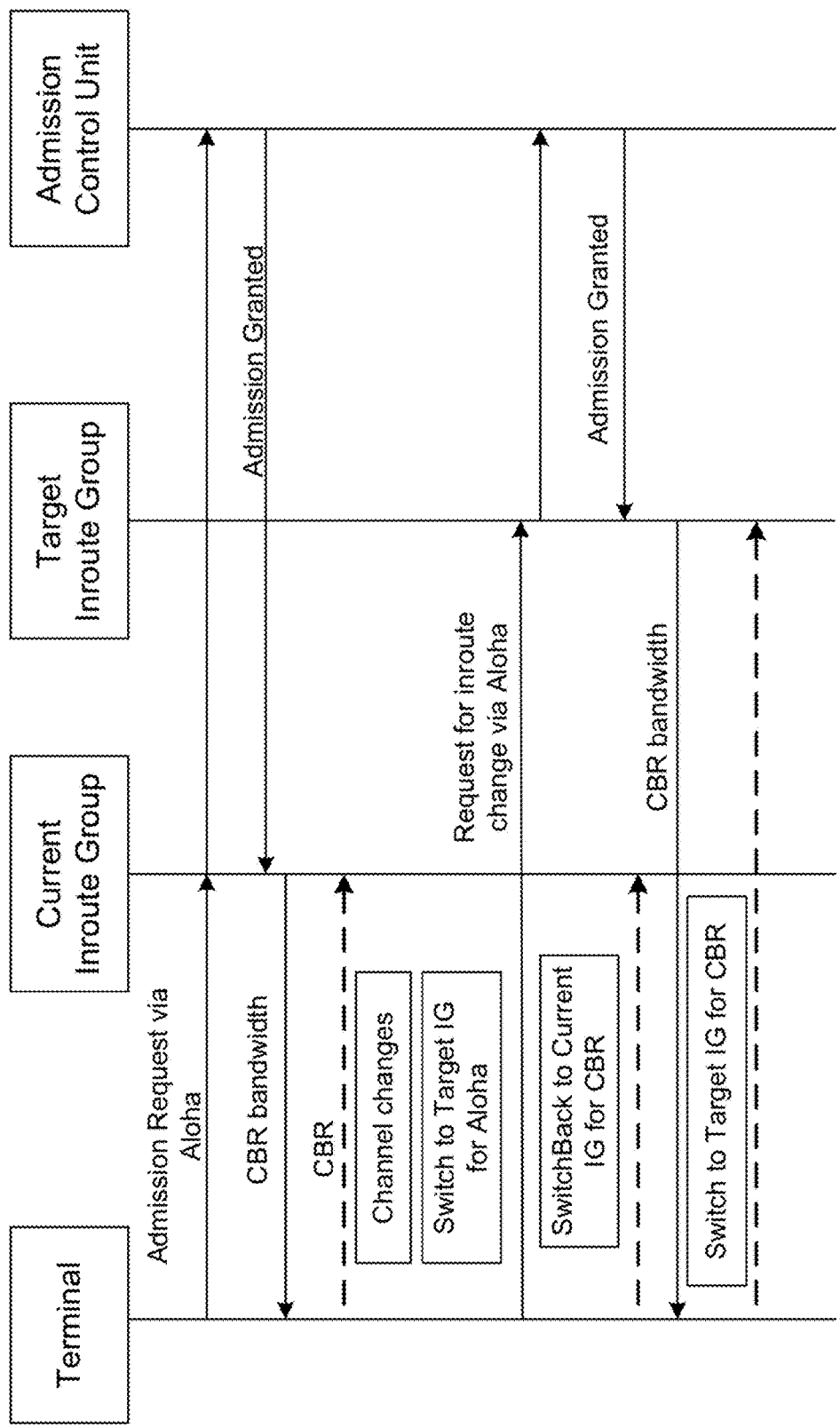
FIG. 9A illustrates an example process for Inroute Transition Initiated by the Terminal, in accordance with example embodiments of the present invention.
Figure 9B:
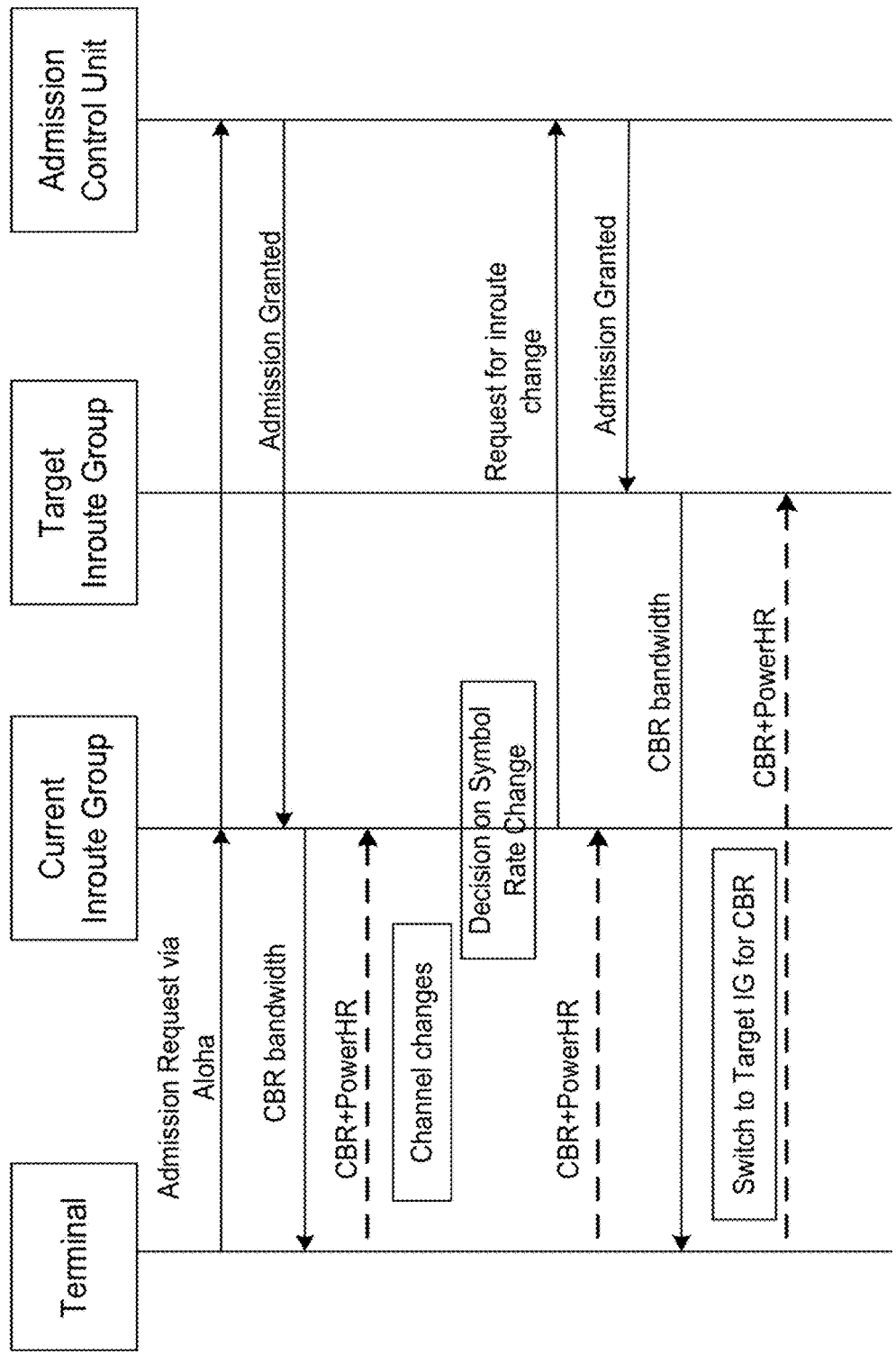
FIG. 9B illustrates an example process for Inroute Transition Initiated by the Gateway, in accordance with example embodiments of the present invention.

In certain circumstances, it may be necessary to transition a terminal from one in route group to another, for example, in channel fading situations, the terminal may be switched to an Inroute Group with a lower (or higher) symbol rate when the channel gets worse (or better). In order to recognize and facilitate such inroute group transitions, according to example embodiments, the network provides a trajectory table, supplying information regarding the received signal to noise plus interference ratio (SNR) at the gateway receiver, $E_s/N_0$, as a function of symbol rate and code rate (where $E_s$ is energy per symbol and $N_0$ is the density of noise plus interference). The required $E_s/N_0$ increases as the symbol or coding rate increases, and decreases as the symbol and coding rate decreases. The terminal learns the actual received $E_s/N_0$ at the Gateway from feedback of the closed loop power control. When the channel gets worse, if the SNR cannot meet the requirement at the current symbol rate, the terminal may choose to move to a lower symbol rate for more link margin. Similarly, when the channel gets better and there is more link margin than needed, the terminal may choose to use higher symbol rate. According to such example embodiments, two options may be employed for terminal transitions between Inroute Groups. FIG. 9A illustrates an example process of a first option (Option 1), where the inroute transition is initiated by the terminal, in accordance with example embodiments of the present invention. FIG. 9B illustrates an example process of a second option (Option 2), where the inroute transition is initiated by the Gateway, in accordance with example embodiments of the present invention. In Option 1, the terminal chooses the Inroute Group autonomously, while Option 2 relies on the gateway side (ACU and IGM) to control the Inroute Group selection.

With reference to FIG. 9A, Option 1 is an inroute group transition initiated by the terminal (where the terminal possesses frequency retune functionality). The terminal has an active VOIP session initiated (the admission/bandwidth request to the ACU has been granted and is being fulfilled with allocated CBR bandwidth within the current Inroute Group). During the session, for example, the inroute SNR for the terminal may drop resulting in insufficient link margin for the current symbol rate. The terminal thus traverses the SNR-Symbol/Code rate trajectory table to locate a lower level Inroute Group. The terminal then sends an Aloha request for an inroute transition via the projected/target symbol rate (the terminal is selecting a new IGM when doing this). The request reflects the required bandwidth allocation for all CBRs in the current Inroute Group, as multiple calls may accumulate in the terminal when inroute transition happens. The request also includes the number of sessions. After sending the Aloha request for bandwidth via the target Inroute Group, the terminal switches back to the current Inroute Group. There is a difference for VOIP and data. For VOIP the terminal keeps on receiving bandwidth allocation and transmitting in the current inroute until the bandwidth of a new inroute is allocated, even though the signal quality may not be assured; whereas, for data the terminal may simply abandon the current inroute and wait for the new one. If the Aloha request is successful, the new bandwidth allocation should arrive in a STO time, and the terminal uses the new assigned inroute for return channel transmission.

At the gateway side, the ACU receives the request, identifying that it is from an existing terminal with calls in service. The ACU checks the status of the targeted Inroute Group (ACU keeps the states of VOIP usage) to see if the request can be accepted. As the transitioning calls have higher priority than the new calls, the ACU uses the criteria with higher admission limit (regular limit plus tolerance). As usually the IGM keeps the VOIP usage within the regular limit, the transferred calls in a terminal are likely be admitted with the higher limit, unless such threshold is reached due to for example, many terminals requesting inroute group transition for VOIP at almost the same time. When the admission is granted, the IGM will start the bandwidth allocation to the terminal from the beginning of the next super frame. The old IGM is notified by the ACU of the completion of the inroute transition and the corresponding terminal is removed from the serving inroute.

With this approach, by way of example, the terminal may need up to one frame (45 ms) to do inroute transition for Aloha and up to one frame to return back to the previous frequency, then wait for the STO time (typically 695 ms) and delay up to a super frame (360 ms) before starting the transmission at the new inroute. During the transition course, the terminal uses the bandwidth allocated in the old inroute. If the Aloha request is unsuccessful, the request is retransmitted. During the course, the terminal should stay, and do not abandon the old Inroute Group as the IGM keeps on allocating the bandwidth. The inroute selection can also move up along the trajectory table, i.e., the terminal chooses a higher symbol rate when the channel gets better. The terminal can stay at the current frequency for the request transmission without worrying about the degradation of call quality. This approach allows the terminal to choose its Inroute Group autonomously.

With reference to FIG. 9B, Option 2 is an inroute group transition managed by the gateway. For this approach, the power headroom (PowerHR) is defined as the difference between the maximum and current transmit power of the terminal, as follows:

$$\text{PowerHR (dB)} = P_{max} - P_{Tx}(t),$$

where $P_{max}$ and $P_{Tx}(t)$ are the maximum and current transmit power, respectively. Power headroom is an indication of link margin that the current modulation and coding can be supported given a certain symbol rate. In receiving the power headroom, the gateway calculates the potential maximum SNR based on the current measurement, given by:

$$\text{SNR}_{max} \text{ (dB)} = \text{SNR}_{measure}(t) + \text{PowerHR}$$

where $\text{SNR}_{max}$ and $\text{SNR}_{measure}(t)$ are maximum and measured SNR, respectively. $\text{SNR}_{max}$ is used by the gateway to compare the SNR thresholds in the trajectory table to determine the inroute transition when needed. For the purpose of spectrum efficiency, the PowerHR message can be transmitted periodically in the CBR channel, using the inactive period of the VOIP call. Typically, we can define two configurable timers, namely $T_{min}$ and $T_{max}$, with default values of 200 ms and 1000 ms, respectively. When $T_{min}$ fires, the PowerHR is transmitted whenever the VOIP is inactive; when $T_{max}$ fires, the PowerHR message can be inserted in the CBR queue. The two timers are reset when the PowerHR is sent.

This is also two level decision making procedure. At the Inroute Group, the IGM evaluates the SNR with the trajectory table to determine whether an inroute transition is needed. If a terminal needs to be switched to another Inroute Group, the IGM sends out a request to the admission control unit (ACU). The ACU checks the status of the targeted Inroute Group (ACU maintains the states of the VOIP usage) and assigns the terminal to it. The new IGM conveys the bandwidth allocation thereafter. In this approach, the terminal needs to continuously send PowerHR information to the IGM during a call. When the call is not in presence, the terminal does not send the PowerHR, but uses the Aloha for inroute selection.

With regard to Bandwidth Release, the terminal sends out bandwidth release request base on the following criteria: (1)

The snooper detects a SIP BYE or CANCEL message having the same Call-ID as an existing call or request; and (2) The individual CBR queue is inactive (no data) for a certain amount of time (default value is 30~60 seconds). At certain circumstances (e.g., deep inroute fading), the terminal may fail in transmission on the return link. The IGM terminates CBR bandwidth allocation if no traffic data is on those allocated slots for configured amount of time. The default timer is 40~60 seconds. The IGM then notifies the ACU to clear the calls.

Further, there could be circumstances that both the terminal and IGM fail to detect a call drop. For example, the terminal is reboot and becomes active again for the IGM time-out. Then the dropped call will not be notified by the ACU until a new call is initiated. Therefore, it is needed that ACU sends out periodic queries to the terminals that have bandwidth reserved for CBRs to synchronize with a terminal for its call status. To do this, the ACU sends out a query to terminals with CBRs periodically; the terminal having CBRs will either respond the ACUs query, or update the ACU, with its current CBR status based on a timer. The period of the timer should be longer than the ACUs querying period. The terminal without CBR calls does not send update CBR status to ACU unless being queried by the ACU. The ACU releases the CBR bandwidth if no response from the terminal.

With regard to Code Rate Adaptation, based on the closed loop power control, the terminal is able to adapt its code rate to the channel condition. Using the feedback of power control, the terminal evaluates the estimated SNR at the gateway and determines the code rate from the trajectory table autonomously (without notifying the gateway in advance). Instead, the terminal sends code rate information together with the bursts. In receiving the data burst, the gateway discovers the code rate. The IGM performs slot allocation for VOIP based on the discovered code rate. Since the terminal may apply a lower level (more conservative) code rate without informing the IGM, the IGM should assign the slot using the code rate one level lower than the currently discovered code rate, except when the current code rate is already the lowest. The slot allocation uses the current code rate if it is already the lowest.

FIG. 10 illustrates a computer system upon which example embodiments according to the present invention can be implemented. The computer system 1000 includes a bus 1001 or other communication mechanism for communicating information, and a processor 1003 coupled to the bus 1001 for processing information. The computer system 1000 also includes main memory 1005, such as a random access memory (RAM) or other dynamic storage device, coupled to the bus 1001 for storing information and instructions to be executed by the processor 1003. Main memory 1005 can also be used for storing temporary variables or other intermediate information during execution of instructions to be executed by the processor 1003. The computer system 1000 further includes a read only memory (ROM) 1007 or other static storage device coupled to the bus 1001 for storing static information and instructions for the processor 1003. A storage device 1009, such as a magnetic disk or optical disk, is additionally coupled to the bus 1001 for storing information and instructions.

According to one embodiment of the invention, approaches in accordance with example embodiments are provided by the computer system 1000 in response to the processor 1003 executing an arrangement of instructions contained in main memory 1005. Such instructions can be read into main memory 1005 from another computer-readable medium, such as the storage device 1009. Execution of the arrangement of instructions contained in main memory 1005 causes the processor 1003 to perform the process steps described herein. One or more processors in a multi-processing arrangement may also be employed to execute the instructions contained in main memory 1005. In alternative embodiments, hard-wired circuitry is used in place of or in combination with software instructions to implement the embodiment of the present invention. Thus, embodiments of the present invention are not limited to any specific combination of hardware circuitry and software.

The computer system 1000 also includes a communication interface 1017 coupled to bus 1001. The communication interface 1017 provides a two-way data communication coupling to a network link 1019 connected to a local network 1021. For example, the communication interface 1017 may be a digital subscriber line (DSL) card or modem, an integrated services digital network (ISDN) card, a cable modem, or a telephone modem to provide a data communication connection to a corresponding type of telephone line. As another example, communication interface 1017 may be a local area network (LAN) card (e.g. for Ethernet™ or an Asynchronous Transfer Mode (ATM) network) to provide a data communication connection to a compatible LAN. Wireless links can also be implemented. In any such implementation, communication interface 1017 sends and receives electrical, electromagnetic, or optical signals that carry digital data streams representing various types of information. Further, the communication interface 1017, for example, includes peripheral interface devices, such as a Universal Serial Bus (USB) interface, a PCMCIA (Personal Computer Memory Card International Association) interface, etc.

The network link 1019 typically provides data communication through one or more networks to other data devices. For example, the network link 1019 provides a connection through local network 1021 to a host computer 1023, which has connectivity to a network 1025 (e.g. a wide area network (WAN) or the global packet data communication network now commonly referred to as the "Internet") or to data equipment operated by service provider. The local network 1021 and network 1025 both use electrical, electromagnetic, or optical signals to convey information and instructions. The signals through the various networks and the signals on network link 1019 and through communication interface 1017, which communicate digital data with computer system 1000, are example forms of carrier waves bearing the information and instructions.

The computer system 1000 sends messages and receives data, including program code, through the network(s), network link 1019, and communication interface 1017. In the Internet example, a server (not shown) might transmit requested code belonging to an application program for implementing an embodiment of the present invention through the network 1025, local network 1021 and communication interface 1017. The processor 1003 executes the transmitted code while being received and/or store the code in storage device 239, or other non-volatile storage for later execution. In this manner, computer system 1000 obtains application code in the form of a carrier wave.

The term "computer-readable medium" as used herein refers to any medium that participates in providing instructions to the processor 1003 for execution. Such a medium may take many forms, including but not limited to non-volatile media, and volatile media. Non-volatile media include, for example, optical or magnetic disks, such as storage device 1009. Volatile media may include dynamic memory, such as main memory 1005. Common forms of computer-readable media include, for example, a floppy disk, a flexible disk, hard disk, magnetic tape, any other magnetic medium, a CD ROM, CDRW, DVD, any other optical medium, RAM, PROM, and EPROM, FLASH EPROM, any other memory chip or cartridge, or any other medium from which a computer can read.

Various forms of computer-readable media may be involved in providing instructions to a processor for execution. For example, the instructions for carrying out at least part of the present invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistance (PDA) and a laptop. An infrared detector on the portable computing device receives the information and instructions borne by the infrared signal and places the data on a bus. The bus conveys the data to main memory, from which a processor retrieves and executes the instructions. The instructions received by main memory may optionally be stored on storage device either before or after execution by processor.

While example embodiments of the present invention may provide for various implementations (e.g., including hardware, firmware and/or software components), and, unless stated otherwise, all functions are performed by a CPU or a processor executing computer executable program code stored in a non-transitory memory or computer-readable storage medium, the various components can be implemented in different configurations of hardware, firmware, software, and/or a combination thereof. Except as otherwise disclosed herein, the various components shown in outline or in block form in the figures are individually well known and their internal construction and operation are not critical either to the making or using of this invention or to a description of the best mode thereof.

In the preceding specification, various embodiments have been described with reference to the accompanying drawings. It will, however, be evident that various modifications may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method comprising:
receiving, by a remote terminal of a wireless communications network, respective data communications packets from one or more interface devices associated with the remote terminal;
capturing a one session request message from a one of the interface device(s) for initiation of a setup process to establish a first communications session over the wireless communications network;
parsing the one session request message to obtain session parameters regarding the first communications session;
determining inroute bandwidth requirements for the first communications session based at least in part on the session parameters;
initiating a bandwidth reservation process to obtain inroute bandwidth allocations to satisfy the inroute bandwidth requirements for the first communications session;
transmitting the one session request message to a session controller at a core node of the wireless communications network, wherein the one session request message is held by the remote terminal and not transmitted until completion of the bandwidth reservation process; and
completing the setup process with the core node to establish the first communications session.

2. The method according to claim 1, wherein the one session request message comprises a Session Initiation Protocol (SIP) INVITE message, and the first communications session comprises a real-time protocol (RTP) communications session.

3. The method according to claim 1, wherein the capturing of the one session request message comprises parsing each data communications packet from a designated source port and/or to a designated destination IP address to identify which packet includes the one session request message.

4. The method according to claim 3, wherein the one session request message is identified based on a session ID that is unique between the respective interface device and the session controller.

5. The method according to claim 1, wherein, prior to the transmission of the one session request message to the session controller, in a case where a subsequent session request message for the initiation of the setup process to establish the first communications session were captured, the method further comprising:
replacing the one session request message with the subsequent session request message; and
transmitting the subsequent session request message (instead of the one session request message) to the session controller, wherein the subsequent session request message is held by the remote terminal and not transmitted until completion of the bandwidth reservation process.

6. The method according to claim 1, wherein, in a case where the bandwidth reservation process was unsuccessful due to a failure within the process, the method further comprising:
reinitiating the bandwidth reservation process upon discovering the failure.

7. The method according to claim 1, wherein, in a case where the bandwidth reservation process was unsuccessful due to unavailability of sufficient bandwidth to satisfy the inroute bandwidth requirements for the first communications session, the method further comprising:
reinitiating the bandwidth reservation process after a predetermined period of time.

8. An apparatus comprising:
a receiver configured to receive respective data communications packets from one or more interface devices associated with the apparatus;
a data parser configured to capture a one session request message received from a one of the interface device(s) for initiation of a setup process to establish a first communications session over a wireless communications network, and to parse the one session request message to obtain session parameters regarding the first communications session; and
a bandwidth processor configured to determine inroute bandwidth requirements for the first communications session based at least in part on the session parameters, and to initiate a bandwidth reservation process to obtain inroute bandwidth allocations to satisfy the inroute bandwidth requirements for the first communications session; and
wherein the data parser is further configured to forward the one session request message for transmission to a session controller at a core node of the wireless communications network, wherein the one session request message is held and not forwarded until completion of the bandwidth reservation process.

9. The apparatus according to claim 8, wherein the one session request message comprises a Session Initiation Protocol (SIP) INVITE message, and the first communications session comprises a real-time protocol (RTP) communications session.

10. The apparatus according to claim 8, wherein the data parser is configured to capture the one session request message by parsing each data communications packet from a designated source port and/or to a designated destination IP address to identify which packet includes the one session request message.

11. The apparatus according to claim 10, wherein the one session request message is identified based on a session ID that is unique between the respective interface device and the session controller.

12. The apparatus according to claim 8, wherein, prior to the forwarding of the one session request message for transmission to the session controller, in a case where the data parser were to capture a subsequent session request message for the initiation of the setup process to establish the first communications session, the data parser is further configured to replace the one session request message with the subsequent session request message, and to forward the one session request message for transmission to the session controller, wherein the subsequent session request message is held and not forwarded until completion of the bandwidth reservation process.

13. The apparatus according to claim 8, wherein, in a case where the bandwidth reservation process was unsuccessful due to a failure within the process, the bandwidth processor is further configured to reinitiate the bandwidth reservation process upon discovering the failure.

14. The apparatus according to claim 8 wherein, in a case where the bandwidth reservation process was unsuccessful due to unavailability of sufficient bandwidth to satisfy the inroute bandwidth requirements for the first communications session, the bandwidth processor is further configured to reinitiate the bandwidth reservation process after a predetermined period of time.

* * * * *